(12) United States Patent
Chen

(10) Patent No.: US 11,909,350 B2
(45) Date of Patent: Feb. 20, 2024

(54) SOLAR POWER SYSTEM AND SUPPORT HOUSING THEREOF

(71) Applicant: Chih-Ying Chen, Taichung (TW)

(72) Inventor: Chih-Ying Chen, Taichung (TW)

( * ) Notice: Subject to any disclaimer, the term of this patent is extended or adjusted under 35 U.S.C. 154(b) by 0 days.

(21) Appl. No.: 17/984,172

(22) Filed: Nov. 9, 2022

(65) Prior Publication Data

US 2023/0163721 A1 May 25, 2023

(30) Foreign Application Priority Data

Nov. 22, 2021 (TW) ................. 110143412

(51) Int. Cl.
| | |
|---|---|
| H02S 30/10 | (2014.01) |
| H02S 10/40 | (2014.01) |
| H02S 40/34 | (2014.01) |
| H02S 40/38 | (2014.01) |
| B60R 11/00 | (2006.01) |
| H02J 7/35 | (2006.01) |

(52) U.S. Cl.
CPC .............. *H02S 30/10* (2014.12); *B60R 11/00* (2013.01); *H02S 10/40* (2014.12); *H02S 40/34* (2014.12); *H02S 40/38* (2014.12); *B60R 2011/004* (2013.01); *H02J 7/35* (2013.01)

(58) Field of Classification Search
CPC .......... H02S 30/10; H02S 10/40; H02S 40/34; H02S 40/38; B60R 11/00
See application file for complete search history.

(56) References Cited

U.S. PATENT DOCUMENTS

2018/0026577 A1   1/2018   Gaveau

FOREIGN PATENT DOCUMENTS

| CN | 107508534 A | 12/2017 | | |
|---|---|---|---|---|
| DE | 102010011289 A1 | * | 9/2011 | ............ H02S 30/20 |
| DE | 102010011289 A1 | | 9/2011 | |
| TW | M439673 U | | 10/2012 | |

OTHER PUBLICATIONS

Mamuzic Branko, DE102010011289 A1, English Machine Translation, pp. 1-10. (Year: 2011).*
Search Report appended to an Office Action, which was issued to Taiwanese counterpart application No. 110143412 by the TIPO dated May 24, 2022, with an English translation thereof (2 pages).
Search Report issued to European counterpart application No. 22208601.9 by the EPO dated May 15, 2023.

* cited by examiner

*Primary Examiner* — Tae-Sik Kang
(74) *Attorney, Agent, or Firm* — Hamre, Schumann, Mueller & Larson, P.C.

(57) ABSTRACT

A support housing includes a housing body and a housing cover. The housing body defines an accommodating space and has an opening spatially communicated with the accommodating space. The housing cover includes a cover plate and a plurality of retaining mechanisms. The cover plate is connected to the housing body and operable to close and open the opening. The cover plate is adapted to support a solar power panel. The retaining mechanisms are connected to the cover plate and slidable in a first direction relative to the cover plate. The retaining mechanisms are spaced apart from one another in the first direction. Any two adjacent ones of the retaining mechanisms are movable toward and away from each other to adjust a distance therebetween so that the solar power panel is clamped therebetween.

20 Claims, 19 Drawing Sheets

SOLAR POWER SYSTEM AND SUPPORT HOUSING THEREOF

CROSS-REFERENCE TO RELATED APPLICATION

This application claims priority to Taiwanese Invention Patent Application No. 110143412, filed on Nov. 22, 2021.

FIELD

The disclosure relates to a system, and more particularly to a solar power system and a support housing thereof.

BACKGROUND

An existing vehicular solar panel is generally glued to an exterior of a vehicular body or fastened to the exterior of the vehicular body by screws, thereby causing subsequent maintenance and disassembly of the vehicular solar panel to be inconvenient. When a vehicular solar panel is replaced by another vehicular solar panel with different size, the vehicular body needs to be re-glued or re-drilled, thereby causing inconvenience.

Further, due to the limitation of an available space of the exterior of the vehicular body for a solar panel installation, the number of the solar panels installed to the vehicular body is few, and the solar panel dimension is restricted. As a result, the wattage generated by the solar panels installed to the vehicular body is low.

Besides, the solar panels are electrically connected to an electrical control box and a storage battery. However, the electrical control box and the storage battery have to be installed inside the vehicular body in order to avoid damage by rain, thereby occupying the limited space inside the vehicular body.

SUMMARY

Therefore, one object of the disclosure is to provide a support housing that can alleviate at least one of the drawbacks of the prior art.

According to one aspect of the disclosure, a support housing includes a housing body and at least one housing cover.

The housing body defines an accommodating space and has at least one opening spatially communicated with the accommodating space.

The at least one housing cover includes a cover plate and a plurality of retaining mechanisms.

The cover plate is connected to the housing body and operable to close and open the at least one opening. The cover plate is adapted to support at least one solar power panel.

The retaining mechanisms are connected to the cover plate and slidable in a first direction relative to the cover plate. The retaining mechanisms are spaced apart from one another in the first direction. Any two adjacent ones of the retaining mechanisms are movable toward and away from each other to adjust a distance therebetween so that the solar power panel is clamped therebetween.

Another object of the disclosure is to provide a solar power system.

According to another aspect of the disclosure, a solar power system includes a solar power apparatus and a support housing.

The solar power apparatus includes a control box, a rechargeable battery, and at least one solar power panel unit. The at least one solar power panel unit includes a plurality of solar power panels.

The support housing includes a housing body and at least one housing cover.

The housing body defines an accommodating space accommodating the control box and the rechargeable battery, and has at least one opening spatially communicated with the accommodating space.

The at least one housing cover includes a cover plate that is connected to the housing body, that is operable to close and open the at least one opening and that supports the solar power panels, and a plurality of retaining mechanisms connected to the cover plate and slidable in a first direction relative to the cover plate. The retaining mechanisms are spaced apart from one another in the first direction. Any two adjacent ones of the retaining mechanisms are movable toward and away from each other to adjust a distance therebetween so that one of the solar power panels is clamped therebetween.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
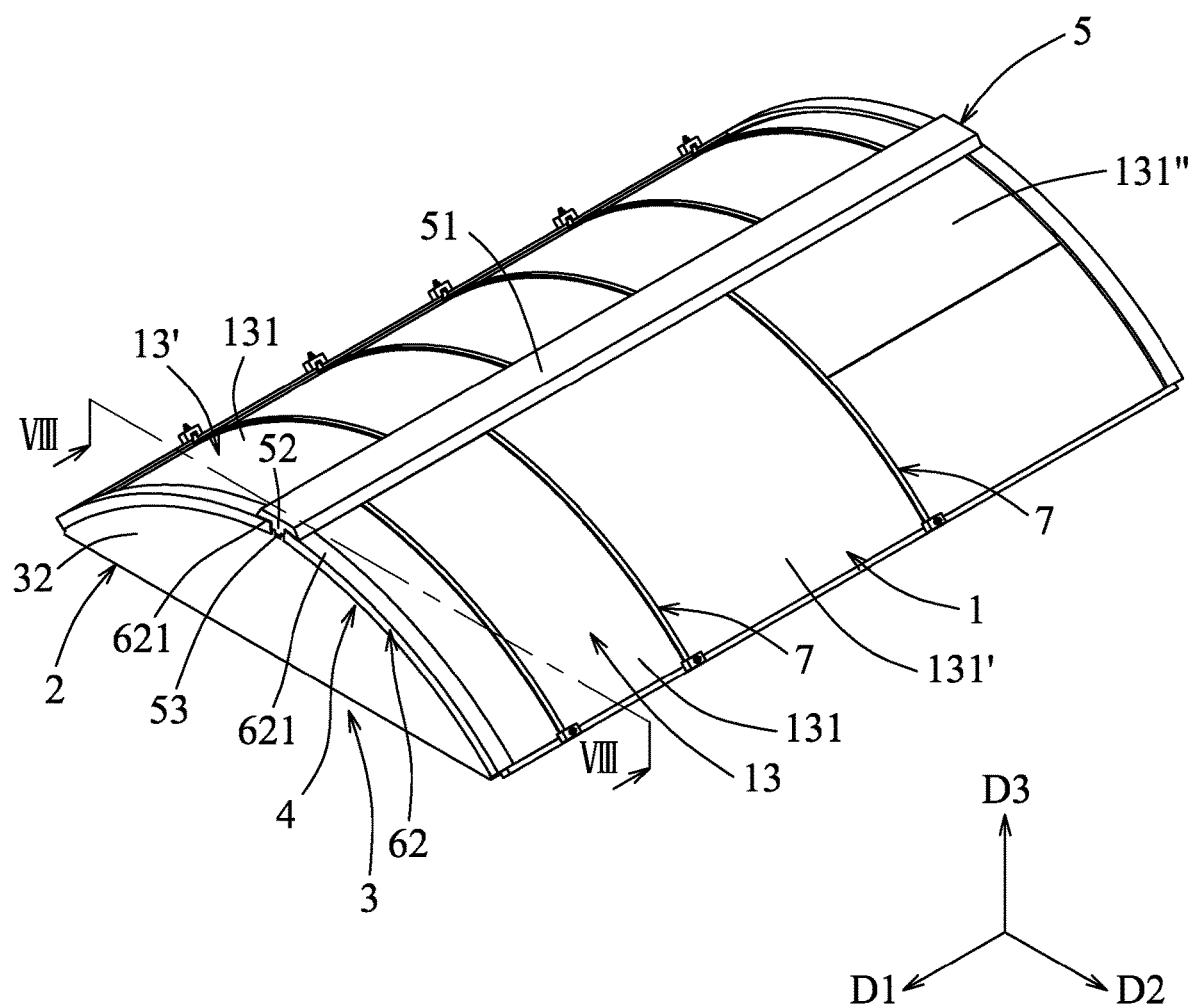
FIG. 1 is a perspective view illustrating a solar power system of an embodiment according to the disclosure.

Referring to FIG. 1, a solar power system 100 of an embodiment according to the disclosure is used to be mounted on a mobile carrier (not shown), such as, but not limited to, a truck or ship, or to be mounted on an immobile carrier, such as a building. The solar power system 100 includes a solar power apparatus 1 and a support housing 2.

For description convenience, regarding the solar power system 100, a first direction (D1) is defined, a second direction (D2) is perpendicular to the first direction (D1), and a third direction (D3) is perpendicular to the first and second directions (D1, D2). In this embodiment, the first direction (D1) is a front-rear direction, the second direction (D2) is a left-right direction, and the third direction (D3) is a top-bottom direction.

Figure 2:
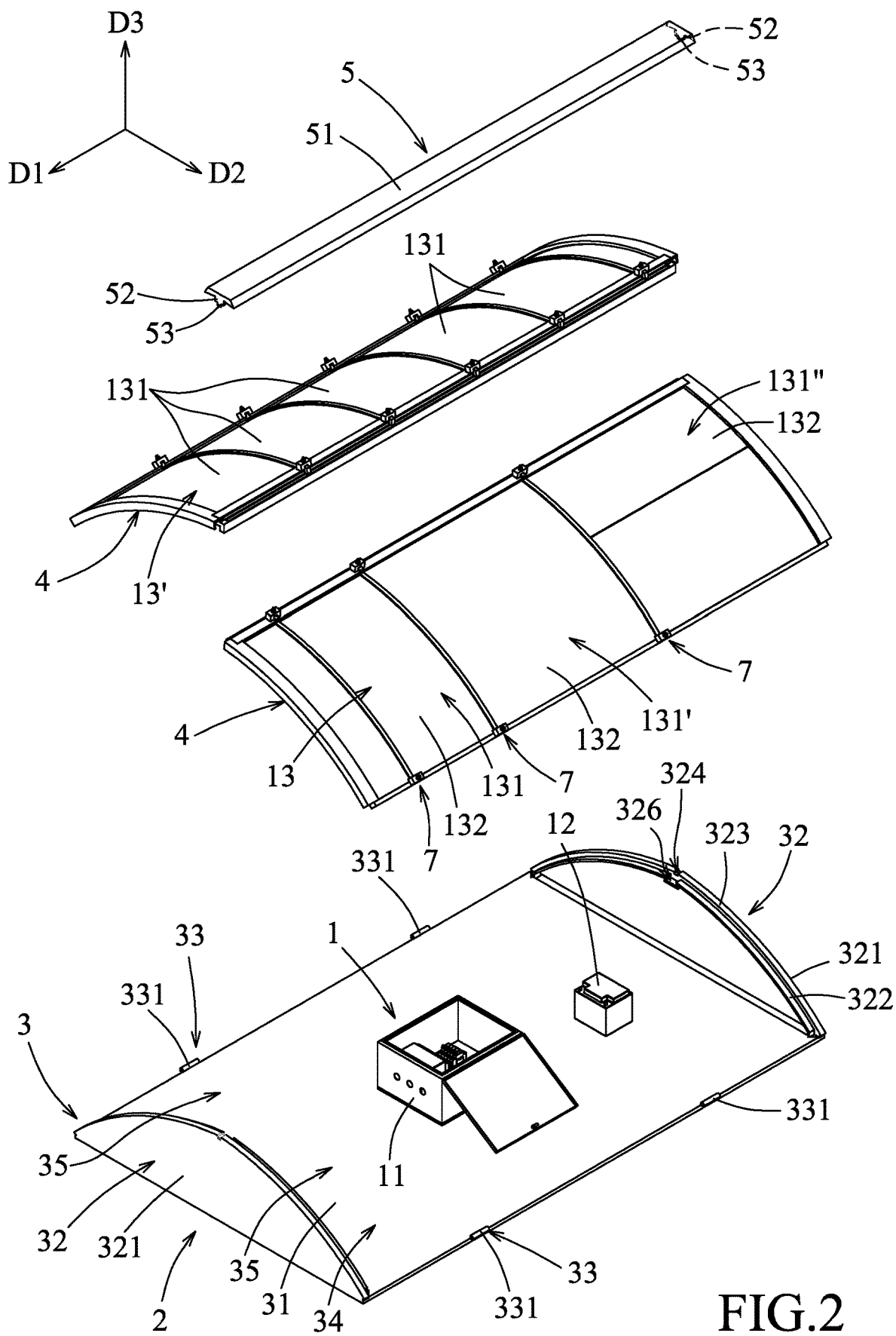
FIG. 2 is an exploded perspective view of the embodiment.
Figure 4:
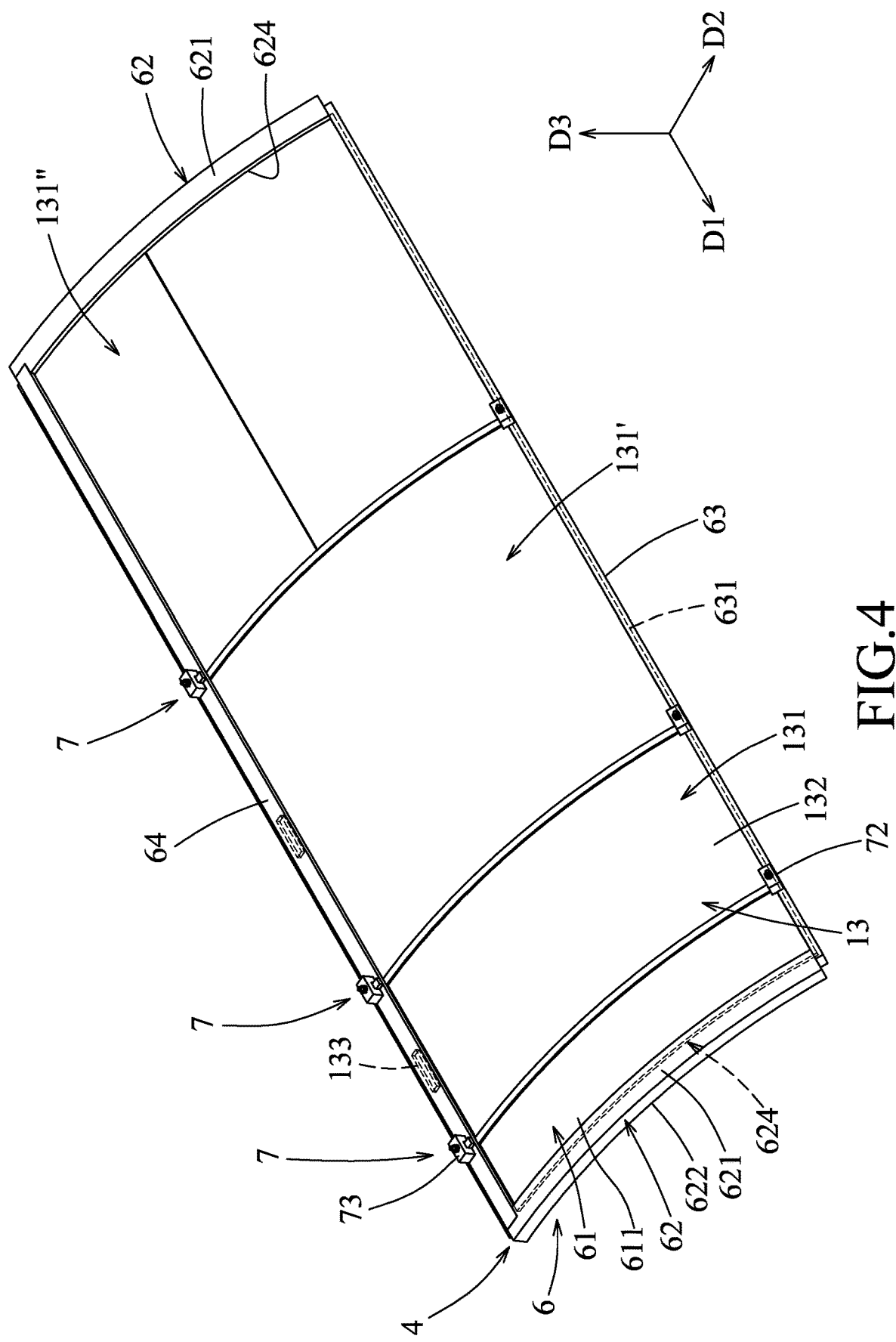
FIG. 4 is a perspective view illustrating assembly of a solar power panel unit to a housing cover of the embodiment.
Figure 5:
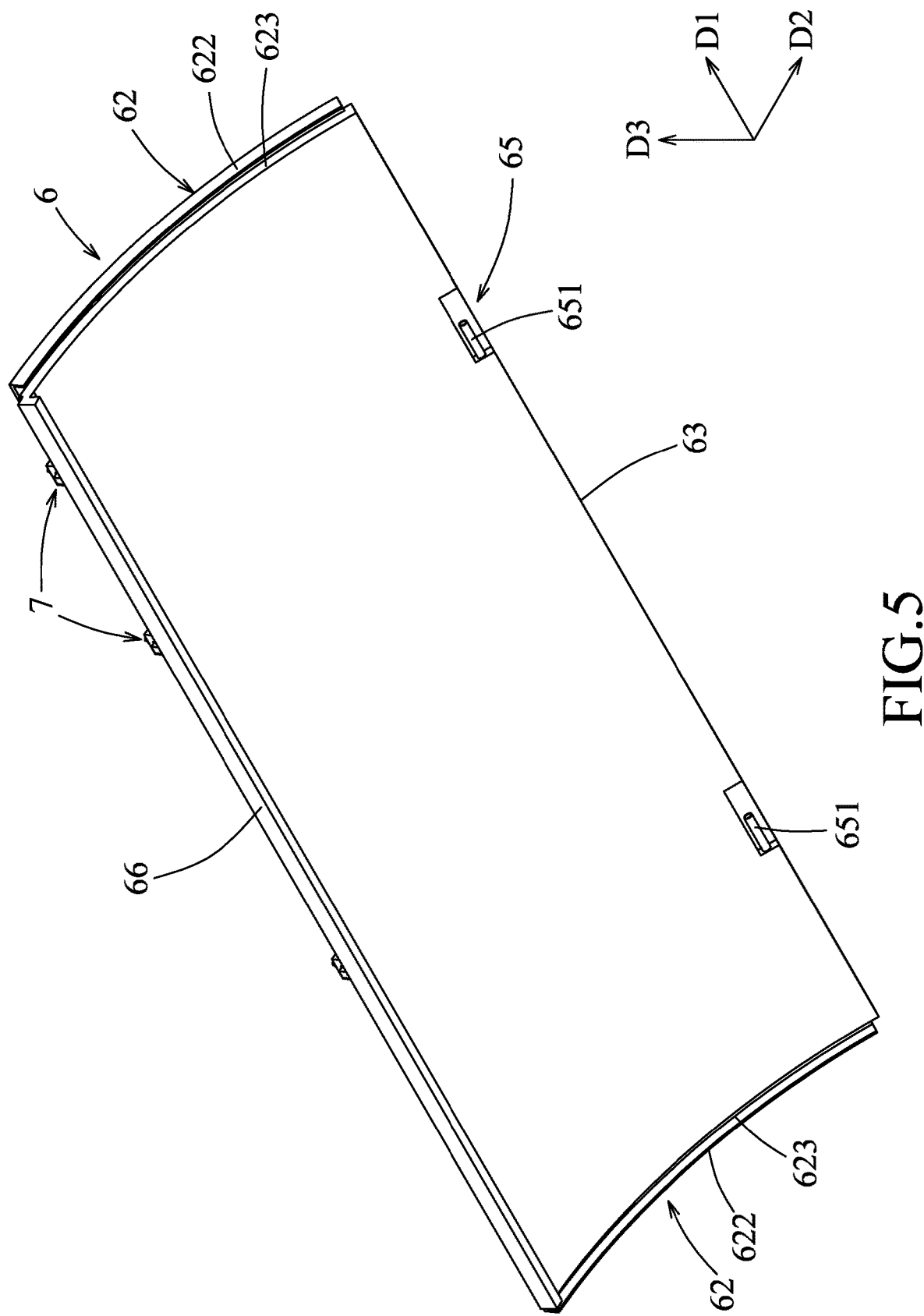
FIG. 5 is a view similar to FIG. 4, but taken from another angle.
Figure 6:
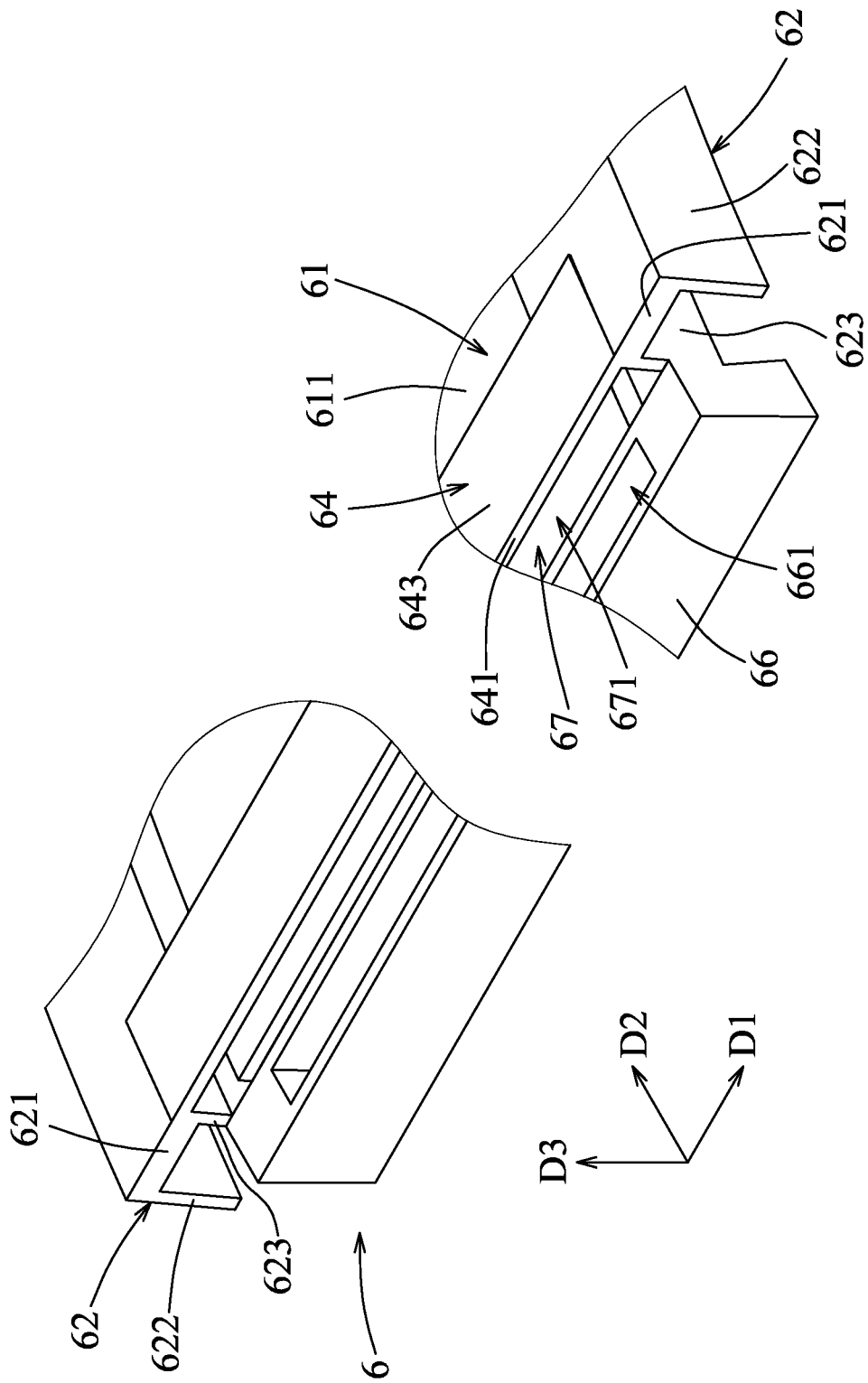
FIG. 6 is a fragmentary perspective view illustrating a cover plate of the embodiment.
Figure 7:
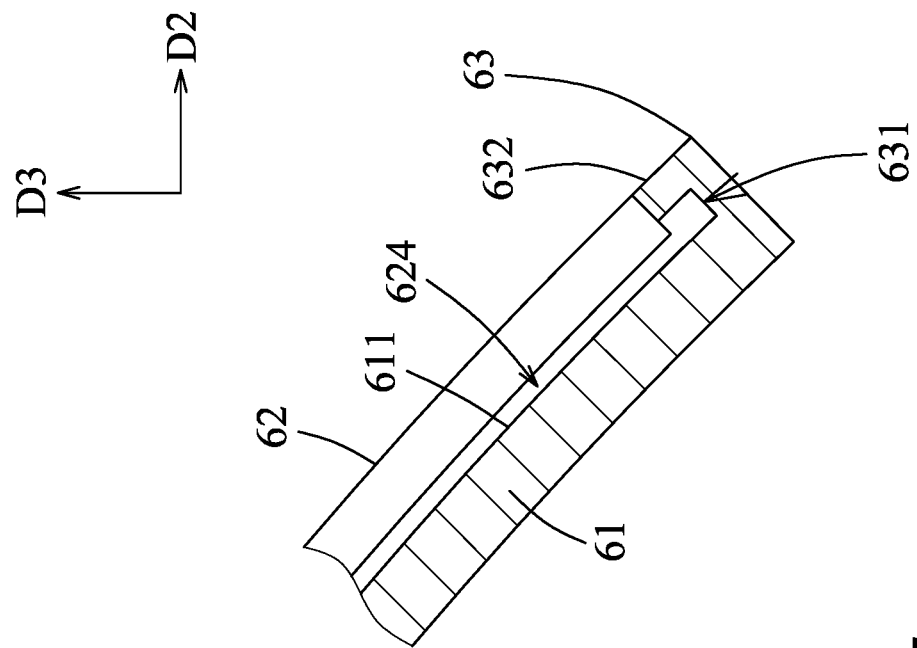
FIG. 7 is a fragmentary sectional view illustrating the cover plate of the embodiment.
Figure 7:
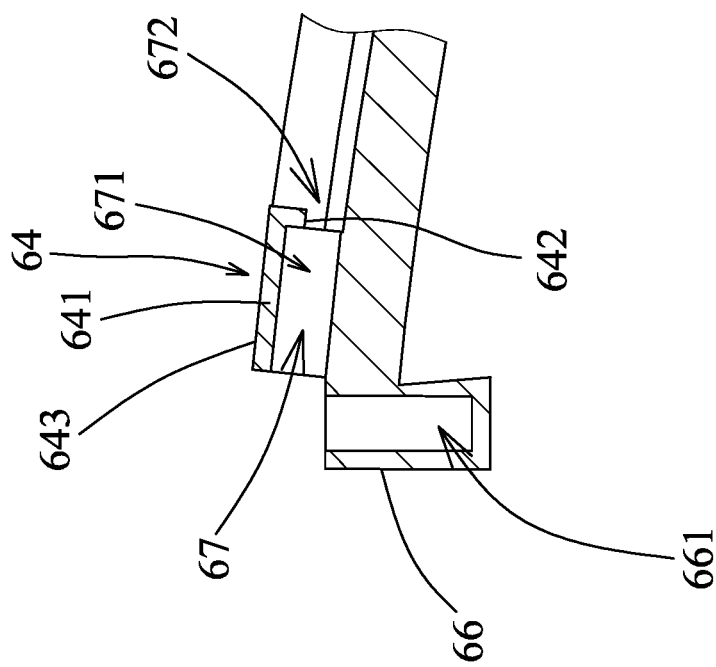

Referring to FIG. 2, the solar power apparatus 1 includes a control box 11, a rechargeable battery 12, and two solar power panel units 13, 13'. The rechargeable battery 12 is electrically connected to the control box 11 by a plurality of conductive wires (not shown). The solar power panel unit 13 includes a plurality of solar power panels 131, 131', and 131" that are different from one another in size. The solar power panel unit 13' includes a plurality of solar power panels 131 that are identical to one another in size. Each of the solar power panels 131, 131', and 131" is a flexible solar panel or a semi-flexible solar panel. Each of the solar power panels 131, 131', and 131" includes a flexible panel body 132 and a junction box 133 disposed on a surface of the flexible body 132 (see FIG. 4). Along the first direction (D1), the flexible body 132 of the solar power panel 131 has a width that is different from the widths of the flexible bodies 132 of the solar power panels 131' and 131". Along the second direction (D2), the flexible body 132 of the solar power panel 131" has a length that is different from the lengths of the flexible bodies 132 of the solar power panels 131 and 131'. The junction box 133 of each of the solar power panels 131, 131', and 131" is electrically connected to the control box 11 by a plurality of transmission cables (not shown).

In this embodiment, while the solar power panels 131, 131', and 131" of the solar power panel unit 13 are different from one another in size, and while the solar power panels 131 of the solar power panel unit 13' are identical to one another in size, the solar power panel units 13, 13' are not limited hereto. The solar power panel unit 13 may include the solar power panels 131, 131', and 131" different from one another in size, and the solar power panel unit 13' may include the solar power panels 131 identical to one another in size.

Figure 3:
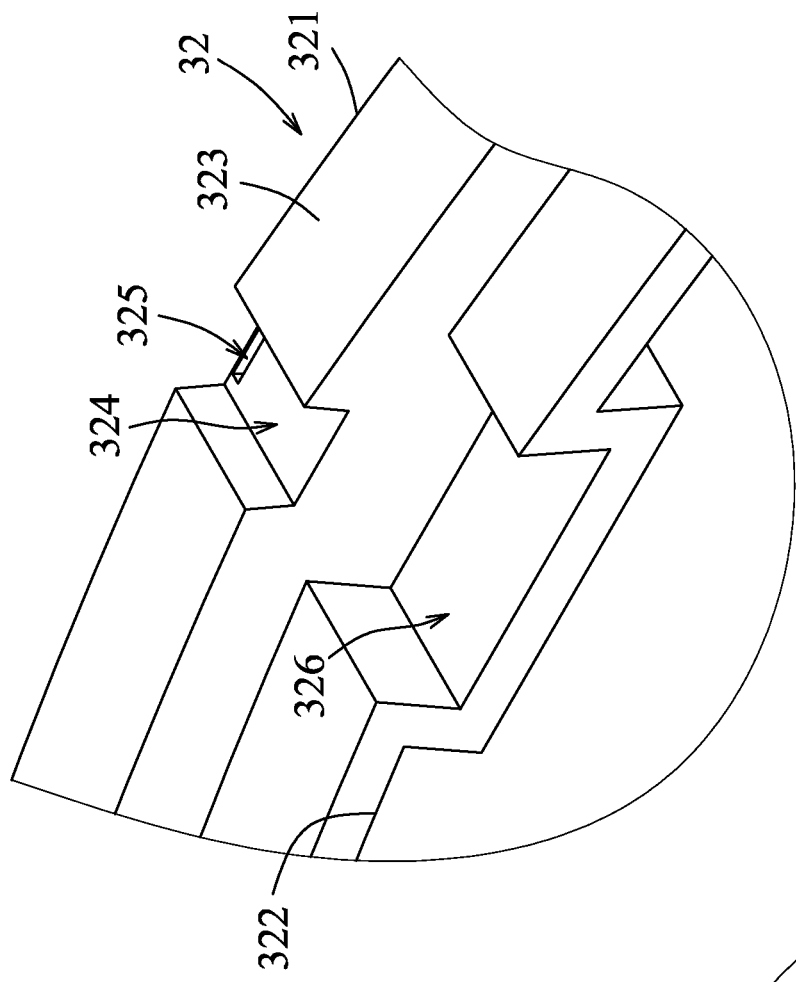
FIG. 3 is a fragmentary perspective view of the embodiment illustrating a cap and two end plates.
Figure 3:
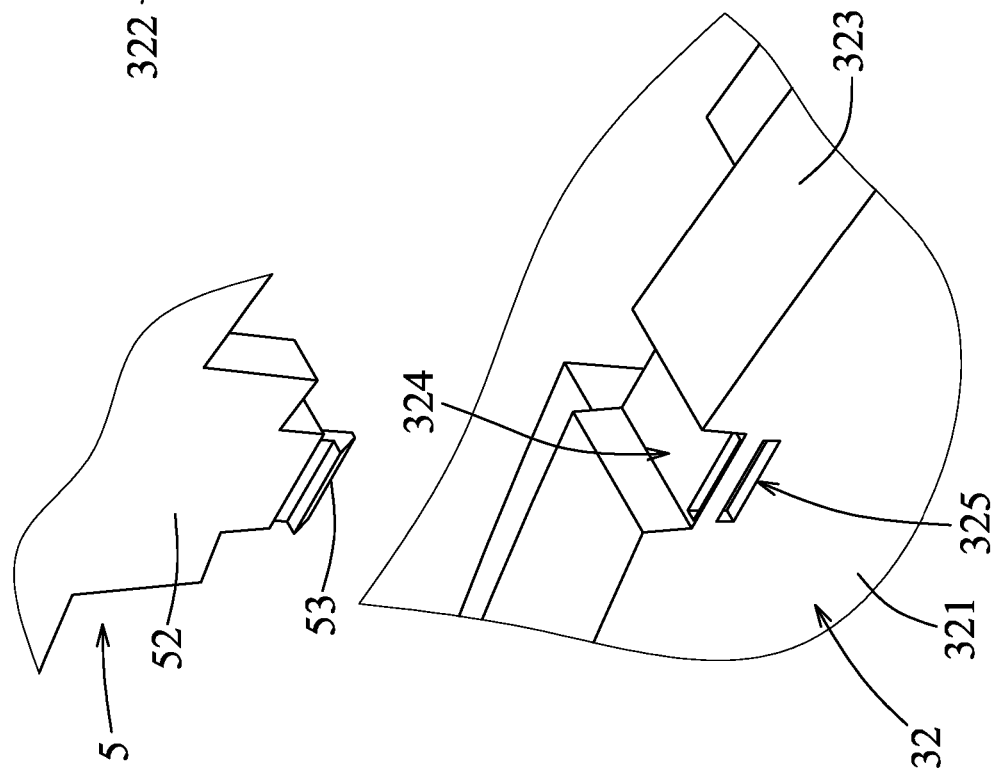

Referring to FIGS. 2 and 3, the support housing 2 includes a housing body 3, two housing covers 4, and a cap 5. The housing body 3 includes a base plate 31, two end plates 32, and two pivoting units 33. The base plate 31 is elongated in the first direction (D1). The base plate 31 is fixed to a top surface of a vehicle body by screwing, tongue-and-groove engagement or welding. The dimension of the base plate 31 is designed in conformity with the dimension of the top surface of the vehicle body so as to maximize the effective use of space above the top surface of the vehicle body.

The end plates 32 are respectively disposed adjacent to two opposite ends of the base plate 31 in the first direction (D1). Each end plate 32 has a plate body 321 and a limiting body 322. The plate body 321 is substantially in the form of a bow plate projecting from the base plate 31. The plate body 321 has a minor arc top surface 323, a positioning slot 324 indented downwardly from a middle portion of the top surface 323, and an engagement recess 325 spatially communicated with a bottom end of the positioning slot 324. The limiting body 322 is disposed above the base plate 31 and is connected to an inner surface of the plate body 321. The limiting body 322 is identical in shape to the top surface 323, and has a positioning groove 326 in position corresponding to the positioning slot 324. The positioning groove 326 is disposed below the positioning slot 324. The pivoting units 33 are respectively disposed on two opposite sides of the base plate 31 in the second direction (D2). Each pivoting unit 33 includes two pivoting bushings 331 spaced apart from each other in the first direction (D1).

The base plate 31 and the ends plates 32 cooperatively define an accommodating space 34, and two openings 35 that are spatially communicated with the accommodating space 34 and that are arranged in the second direction (D2). The accommodating space 34 accommodates the control box 11, the rechargeable battery 12, and backup solar panels (not shown). In some embodiments, the openings 35 may, but not limited to, be arranged in the first direction (D1). By virtue of the control box 11 and the rechargeable battery 12 being accommodated within the accommodating space 34 disposed outside the vehicle body, an inside space of the vehicle body is prevented from being occupied by the control box 11 and the rechargeable battery 12.

Referring to FIGS. 2, 4 to 6, the housing covers 4 respectively support the solar power panel units 13, 13". The housing covers 4 are spaced apart from each other in the second direction (D2) and are pivotally connected to the housing body 3. Each housing cover 4 includes a cover plate 6 and a plurality of retaining mechanisms 7. Each cover plate 6 is pivotally connected to the housing body 3, and is operable to close and open a respective one of the openings 35. The retaining mechanisms 7 of each housing cover 4 are spaced apart from one another in the first direction (D1), are connected to the corresponding cover plate 6, and are slidable in the first direction (D1) relative to the corresponding cover plate 6. Any two adjacent ones of the retaining mechanisms 7 are movable toward and away from each other to adjust a distance therebetween so that one of the solar power panels 131, 131', and 131" is clamped therebetween.

In this embodiment, the cover plate 6 of each housing cover 4 is elongated in the first direction (D1) and has an arcuate cross section in the second direction (D2). Each cover plate 6 includes a cover body 61, two end frames 62, a first guide rail 63, a second guide rail 64, a pivot unit 65, and a lateral wall 66. The cover body 61 of each cover plate 6 has a supporting surface 611 supporting the solar power panels 131, 131', and 131" and having an arcuate cross section in the second direction (D2). The end frames 62 of each cover plate 6 are disposed on the corresponding cover body 61 and are opposite to each other in the first direction (D1). The end frames 62 of the cover plates 6 of the housing covers 4 cover the plate bodies 321 of the end plates 32. Each end frame 62 includes a top wall 621 to shield the top surface 323 of the plate body 321 of a respective one of the end plates 32 (see FIG. 3), an outer wall 622 that extends downwardly from an outer end of the top wall 621 and that abuts against an outer surface of the plate body 321 of the respective end plate 32, and an inner wall 623 that extends downwardly from the top wall 621 and that abuts against an inner surface of the plate body 321. The inner wall 623 of each end frame 62 is formed with an end slot 624. The end slots 624 of the end frames 62 are spaced apart from each other in the first direction (D1). Each end slot 624 is engageable with a corresponding one of the solar power panels 131, 131', and 131".

Referring to FIGS. 4 to 7, for each housing cover 4, the first guide rail 63 is disposed on a long side of the cover body 61, extends in the first direction (D1), and is connected between the end frames 62. The first guide rail 63 defines a first lateral slot 631 spatially communicated with the end slots 624 of the end frames 62. The first lateral slot 631 is engageable with corresponding ones of the solar power panels 131, 131', and 131". The first guide rail 63 has a guide wall 632 spaced apart from the supporting surface 611 of the cover body 61. The second guide rail 64 is connected between the inner walls 623 of the end frames 62, is spaced apart from the cover body 61 in the third direction (D3), and is spaced apart from the first guide rail 63 in the second direction (D2). The second guide rail 64 includes a guide plate 641 and a stop strip 642. The guide plate 641 is elongated in the first direction (D1) and is spaced apart from the supporting surface 611. The guide plate 641 has a guide surface 643 facing away from the supporting surface 611. The stop strip 642 projects from the guide plate 641 toward the supporting surface 611, and is disposed to a side of the guide plate 641 closer to the first guide rail 63.

The cover body 61, the end frames 62, and the second guide rail 64 cooperatively define a second lateral slot 67 that is spatially communicated with the end slots 624 of the end frames 62. The second lateral slot 67 is an open-ended slot, and has a first slot portion 671 disposed between the guide plate 641 and the supporting surface 611, and a second slot portion 672 disposed between the supporting surface 611 and the stop strip 642. A distance of the second slot portion 672 between the supporting surface 611 and the stop strip 642 is smaller than a distance of the first slot portion 671 between the guide plate 641 and the supporting surface 611. The first slot portion 671 accommodates the junction boxes 133 of the solar power panels 131, 131', and 131" while the second slot 672 allows the flexible bodies 132 of the solar power panels 131, 131', and 131" to extend therethrough. Because the distance of the second slot 672 between the supporting surface 611 and the stop strip 642 is smaller than a thickness of the junction box 133 of each of the solar power panels 131, 131', and 131", the junction box 133 of each of the solar power panels 131, 131', and 131" is confined in the first slot portion 671 of the second lateral slot 67 by the stop strip 642.

For the cover plate 6 of each housing cover 4, the pivot unit 65 includes two pivot pins 651 that are disposed on the first guide rail 63 and that are spaced apart from each other in the first direction (D1). Each pivot pin 651 is pivotally connected to a respective one of the pivoting bushings 331 (see FIG. 2). The lateral wall 66 is disposed on a long side of the cover body 61 opposite to the first guide rail 63, is connected between the inner walls 623 of the end frames 62, and has a wire management groove 661. The wire management groove 661 accommodates the transmission cables (not shown) connecting the junction boxes 133 of the solar power panels 131, 131', and 131" to the control box 11.

Figure 8:
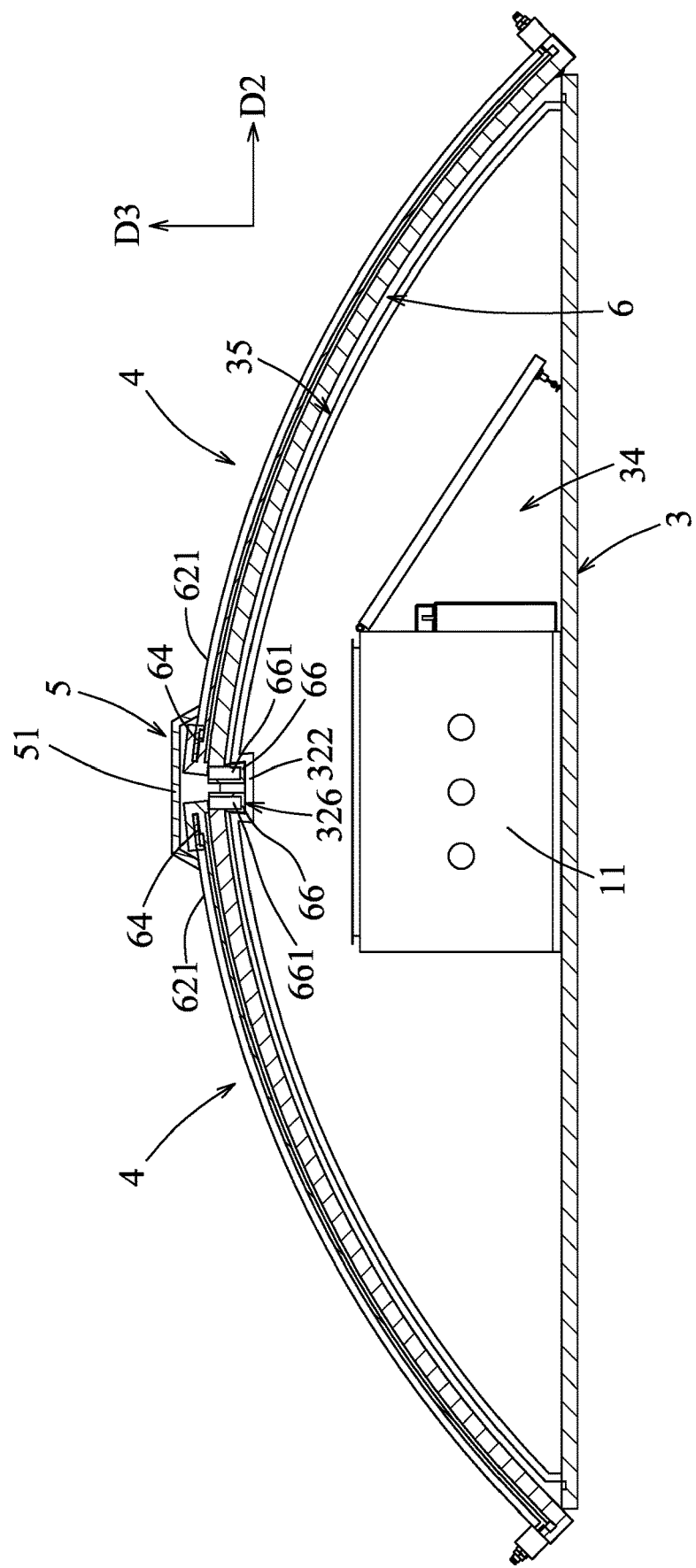
FIG. 8 is a sectional view taken from line VIII-VIII of FIG. 1, illustrating housing covers of the embodiment in closed positions.
Figure 9:
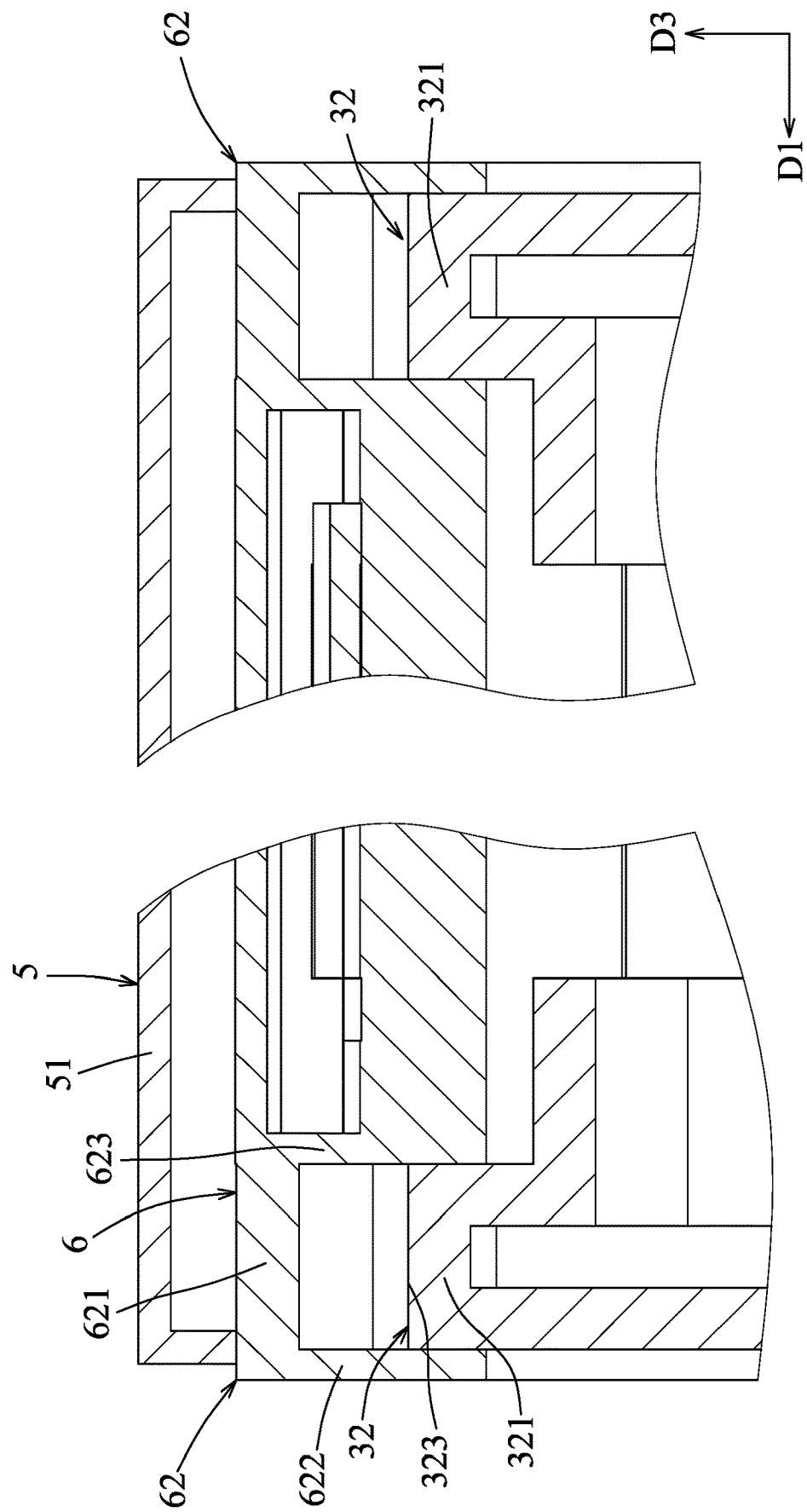
FIG. 9 is a fragmentary sectional view of the embodiment illustrating end frames of the cover plate respectively covering end plates of a housing body.
Figure 10:
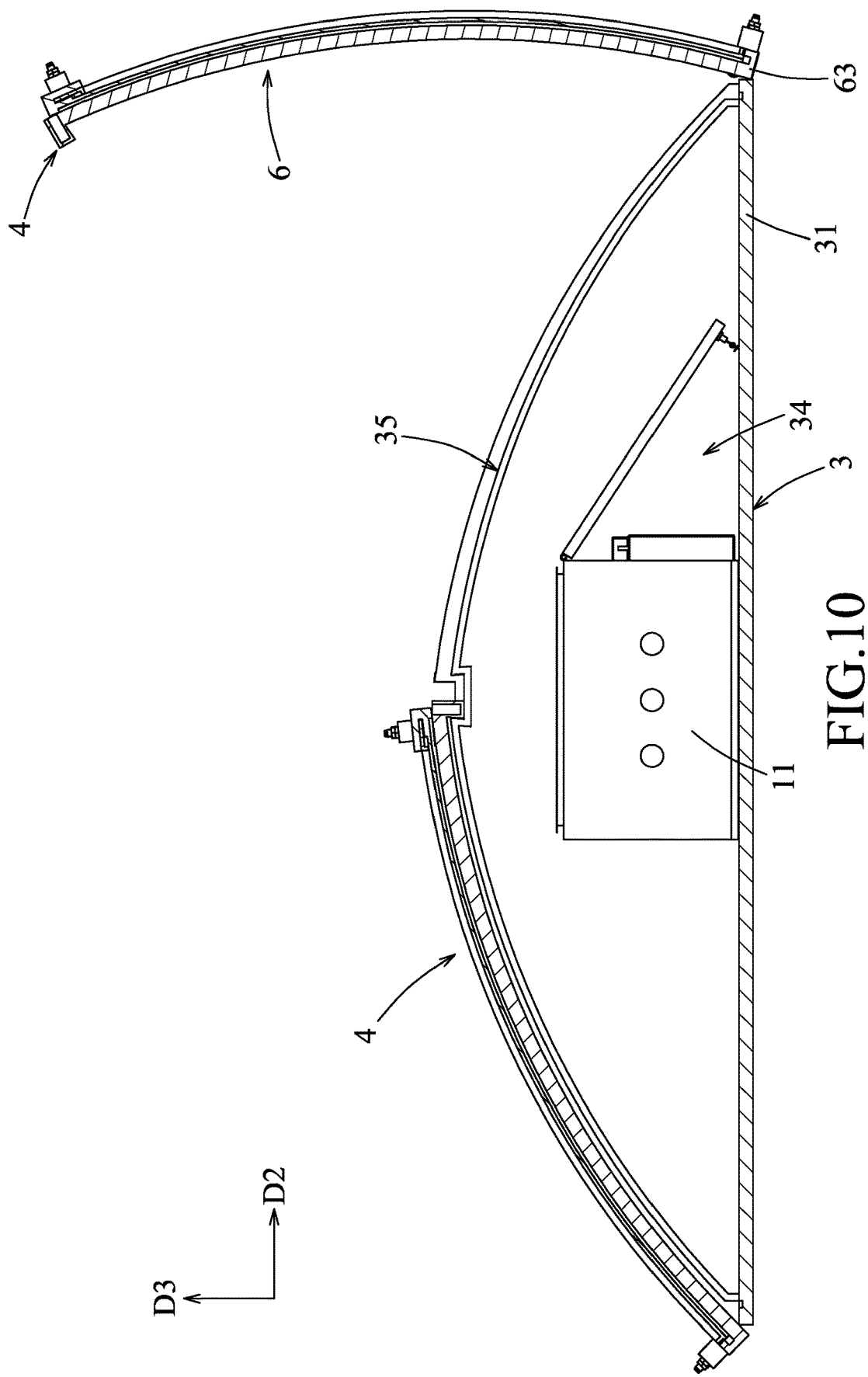
FIG. 10 is a view similar to FIG. 8, but illustrating one of the housing covers in an open position.

Referring to FIGS. 8 to 10, by virtue of the pivot pins 651 respectively pivotally connected to the pivoting bushings 331 (see FIGS. 2 and 5), each housing cover 4 is rotatable relative to the housing body 3 between a closed position (see FIG. 8), where a respective one of the openings 35 is closed, and an open position (see FIG. 10), where the respective one of the openings 35 is opened. When each of the housing covers 4 is in the closed position, the lateral walls 66 of the cover plates 6 of the housing covers 4 are adjacent to each other and respectively engaged within the positioning grooves 326 of the limiting bodies 322 of the end plates 32, the end frames 62 of the cover plates 6 respectively cover the plate bodies 321 of the end plates 32, the top walls 621 of the end frames 62 of the cover plates 6 respectively cover the top surfaces 323 of the plate bodies 321 of the end plates 32, and the outer and inner walls 622, 623 of each end frame 62 respectively abut against the outer and inner surfaces of the plate body 321 of the respective end plate 32, thereby positioning each housing cover 4 in the closed position.

When each housing cover 4 is in the closed position, the top walls 621 of the end frames 62 of the cover plates 6 respectively shield the top surfaces 323 of the plate bodies 321 of the end plates 32 from rain water. By virtue of the outer surfaces of the plate bodies 321 of the end plates 32 in abutment with the outer walls 622 of the end frames 62, the outer wall 622 of each end frame 62 can greatly reduce the rain water flowing through a gap between the top wall 621 of each end frame 62 and the top surface 323 of the plate body 321 of the respective end plate 32. By virtue of the inner surfaces of the plate bodies 321 of the end plates 32 in abutment with the inner walls 623 of the end frames 62, even if the rain water seeps through the gap between the top wall 621 of each end frame 62 and the top surface 323 of the plate body 321 of the respective end plate 32, the inner wall 623 of each end frames 62 blocks the rain water. As a result, the rain water is effectively prevented from seeping into the accommodating space 34 of the housing body 3.

When one of the housing covers 4 is in the open position, the corresponding opening 35 is opened and the first guide rail 63 of the cover plate 6 abuts against the base plate 31 for positioning the corresponding housing cover 4, so that the control box 11 and the rechargeable battery 12 accommodated in the corresponding accommodating space 34 can be inspected, maintained or replaced through the corresponding opening 35.

Figure 13:
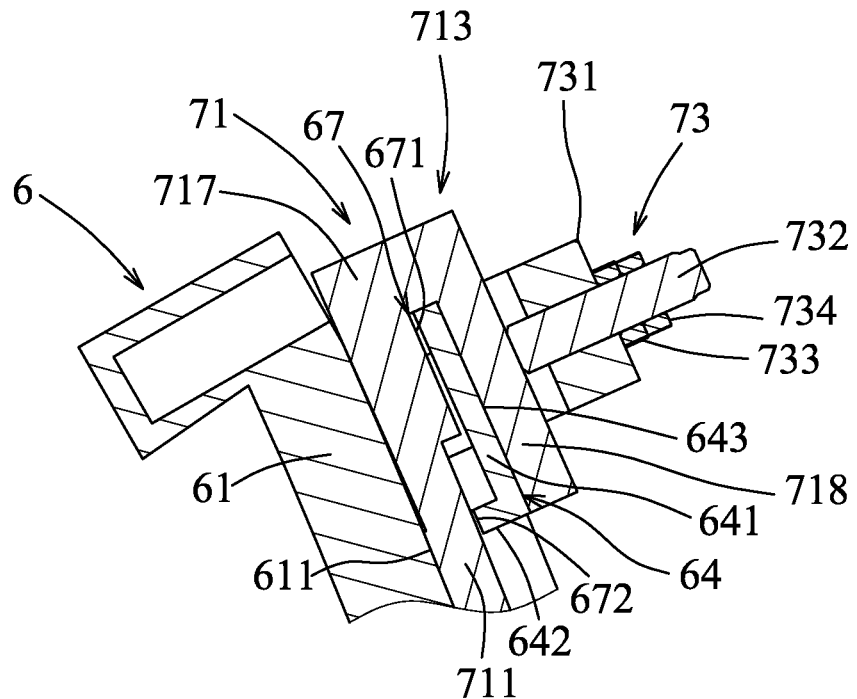
FIG. 13 is a fragmentary sectional view of the embodiment illustrating the cover plate, the retaining bar, and first and second securing sets.
Figure 13:
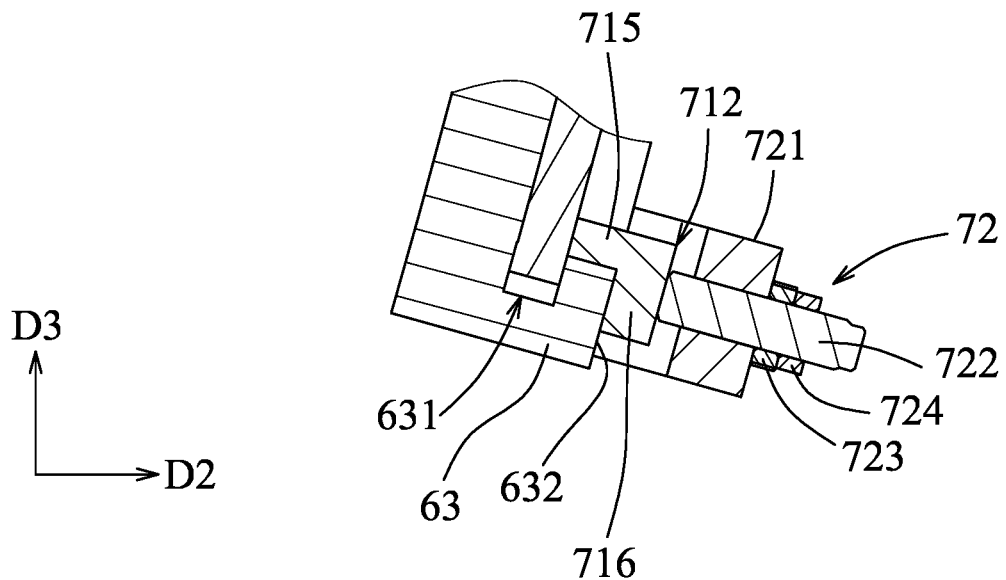

Referring to FIGS. 4, 11 to 13, each of the retaining mechanisms 7 includes a retaining bar 71, a first securing set 72, and a second securing set 73. The retaining bar 71 is arcuate and elongated in the second direction (D2), and is slidably connected between the first and second guide rails 63, 64 of the cover plate 6 so as to retain two adjacent ones of the solar power panels 131, 131' and 131". The retaining bar 71 has a bar body 711, a first sliding member 712, and a second sliding member 713. The bar body 711 is arcuate and elongated in the second direction (D2), is slidable within the second lateral slot 67, and conforms in shape with the supporting surface 611 of the cover body 61. The bar body 711 has two engaging slots 714 that are opposite to each other in the first direction (D1). Each engaging slot 714 is engaged with the flexible body 132 of a corresponding one of said solar power panels 131, 131' and 131". As shown in FIG. 13, an end of the bar body 711 is slidable between the second guide rail 64 and the supporting surface 611 of the cover plate 6 by extending through the first and second slot portions 671, 672 of the second lateral slot 67, and an opposite end of the bar body 711 is inserted into and slidable within the first lateral slot 631 of the first guide rail 63. As a result, the bar body 711 is slidably engaged with the first and second lateral slots 631, 67. The first and seconds sliding members 712,713 are connected respectively to two opposite ends of the bar body 711.

The first sliding member 712 is slidably hung on the first guide rail 63, is L-shaped, and has a first abutment portion 715 and a first pressing portion 716. The first abutment portion 715 is perpendicular and fixed to the bar body 711 by welding, and abuts against an inner side of the first guide rail 63. The first pressing portion 716 is perpendicularly connected to the first abutment portion 715, is spaced apart from the bar body 711, and contacts the guide wall 632 of the first guide rail 63. The second sliding member 713 is slidably hung on the second guide rail 64, is also L-shaped, and has a second abutment portion 717 and a second pressing portion 718. The second abutment portion 717 is integrally connected to the bar body 711 and abuts against an outside of the guide plate 641 of the second guide rail 64. The second pressing portion 718 is perpendicularly connected to the second abutment portion 717, is spaced apart from the bar body 711, and contacts the guide surface 643 of the second guide rail 64.

By virtue of the retaining bar 71 of each retaining mechanism 7 being slidably engaged with the first and second lateral slots 631, 67, any two adjacent ones of the retaining mechanisms 7 are movable toward and away from each other in the first direction (D1) to adjust a distance therebetween so that one of the solar power panels 131, 131, and 131" is clamped therebetween. Besides, by virtue of the first and second sliding members 712, 713 respectively and slidably hung on the first and second guide rails 63, 64, the sliding stability of the retaining bar 71 is enhanced in the first direction (D1) while the bar body 711 is prevented from disengaging from the first and second lateral slots 631, 67.

Figure 11:
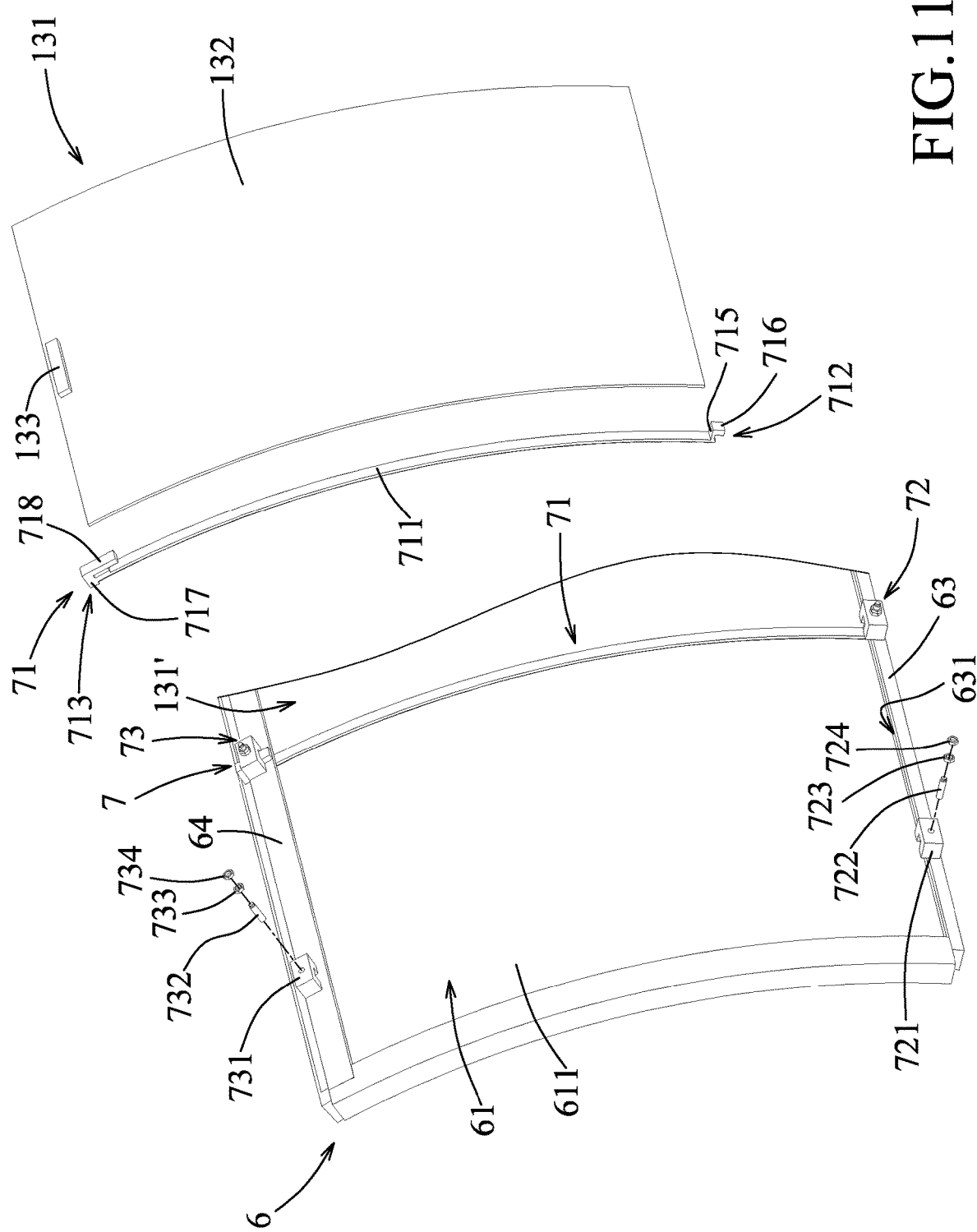
FIG. 11 is a fragmentary perspective view illustrating the cover plate, retaining mechanisms and a solar power panel.
Figure 12:
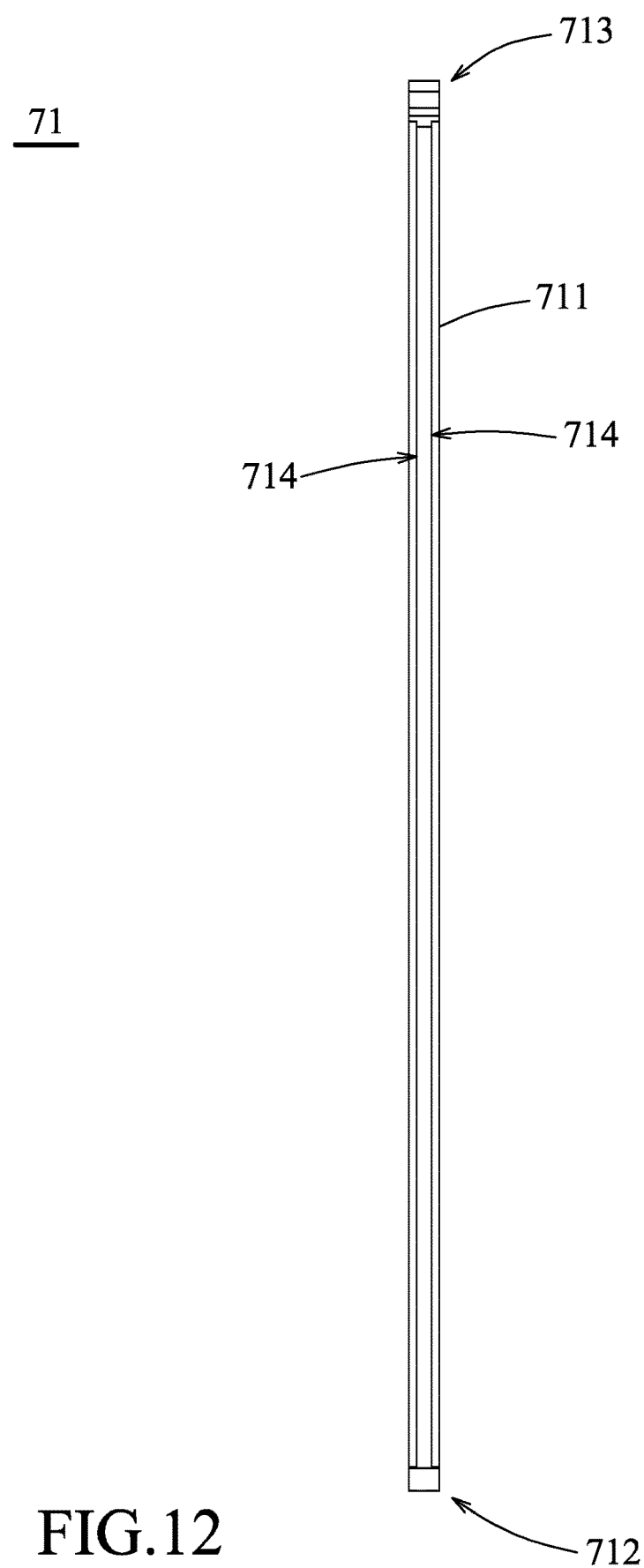
FIG. 12 is a bottom view illustrating a retaining bar of the embodiment.
Figure 14:
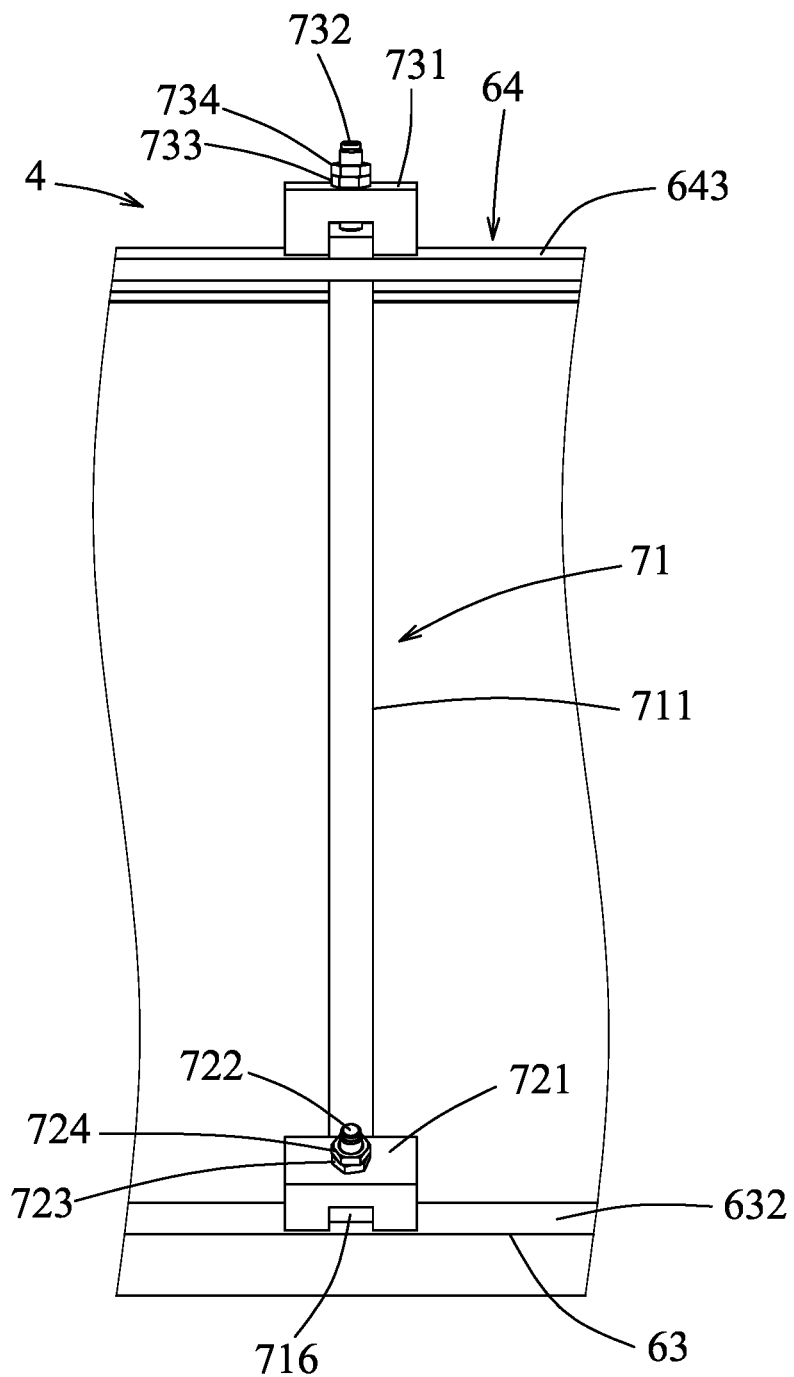
FIG. 14 is a fragmentary perspective view of the embodiment illustrating the housing cover.

Referring to FIGS. 11, 13, and 14, the first securing set 72 includes a first holding block 721, a first bolt 722, a first nut 723, and a first stop nut 724. The first holding block 721 is an inverted U-shaped block and abuts against the guide wall 632 of the first guide rail 63 to hold the first pressing portion 716 in a non-rotational manner. The first bolt 722 is movably inserted through the first holding block 721 and abuts against the first pressing portion 716 by welding an end of the first bolt 722 to the first pressing portion 716. The first nut 723 is threadedly connected to the first bolt 722 and abuts against a side of the first holding block 721 distal from the first guide rail 63. The first nut 723 is operably rotatable to drive movement of the first bolt 722 until the first bolt 722 locks the first pressing portion 716 on the guide wall 632 of the first guide rail 63. The first stop nut 724 is threadedly connected to the first bolt 722 and abuts against the first nut 723, thereby preventing the first nut 723 from being detached from the first bolt 722.

In this embodiment, the first nut 723 is clockwise rotated to drive movement of the first bolt 722 until the first bolt 722 locks the first pressing portion 716 on the guide wall 632 of the first guide rail 63. As a result, the first securing set 72 is converted to a locking state and locks the first pressing portion 716 on the first guide rail 63. By counterclockwise rotation of the first nut 723, the first bolt 722 is driven by the first nut 723 to move together with the first pressing portion 716 away from the guide wall 632 of the first guide rail 63, thereby unlocking the first pressing portion 716 from the guide wall 632 of the first guide rail 63 and converting the first securing set 72 to an unlocking state.

The second securing set 73 is identical in structure to the first securing set 72, and includes a second holding block 731, a second bolt 732, a second nut 733, and a second stop nut 734. The second holding block 731 is an inverted U-shaped block and abuts against the guide surface 643 of the second guide rail 64 to hold the second pressing portion 718 in a non-rotational manner. The second bolt 732 is movably inserted through the second holding block 731 and abuts against the second pressing portion 718 by welding an end of the second bolt 732 to the second pressing portion 718. The second nut 733 is threadedly connected to the second bolt 732 and abuts against a side of the second holding block 731 distal from the first guide rail 64. The second nut 733 is operably rotatable to drive movement of the second bolt 732 until the second bolt 732 locks the second pressing portion 718 on the guide surface 643 of the second guide rail 64. The second stop nut 734 is threadedly connected to the second bolt 732 and abuts against the second nut 733, thereby preventing the second nut 733 from being detached from the second bolt 732.

In this embodiment, the second nut 733 is clockwise rotated to drive movement of the second bolt 732 until the second bolt 732 locks the second pressing portion 718 on the guide surface 643 of the second guide rail 64. As a result, the second securing set 73 is converted to a locking state and locks the second pressing portion 716 on the second guide rail 64. By counterclockwise rotation of the second nut 733, the second bolt 732 is driven by the second nut 733 to move together with the second pressing portion 718 away from the guide surface 643 of the second guide rail 64, thereby unlocking the second pressing portion 718 from the guide surface 643 of the second guide rail 64 and converting the second securing set 73 to an unlocking state.

Because the end of the first bolt 722 of the first securing set 72 is welded to the first pressing portion 716, and because the end of the second bolt 732 of the second securing set 73 is welded to the second pressing portion 718, when the first and second securing sets 72, 73 are converted to the unlocking states, the retaining bar 71 drives the first and second securing sets 72, 73 to move together therewith during sliding movement of the retaining bar 71 in the first direction (D1). When the retaining bar 71 slides to a retaining position to retain the flexible body 132 of one of the solar power panels 131, 131' and 131", the first and second securing sets 72, 73 are converted to the locking states to lock the retaining bar 71 at the retaining position.

Referring to FIGS. 1 to 3, and 8, the cap 5 includes a cap body 51, two positioning plates 52, and two hooks 53. The cap body 51 is elongated in the first direction (D1). The positioning plates 52 project from a bottom side of the cap body 51 and are spaced apart from each other in the first direction (D1). The hooks 53 are respectively disposed on bottom ends of the positioning plates 52 and respectively extend toward each other in the first direction (D1). When each housing cover 4 is in the closed position, to assemble the cap 5 to the end plates 32 of the housing body 3, the cap body 51 abuts against the top walls 621 of the end frames 62 of the cover plates 6 of the housing covers 4 and covers the second guide rails 64 and the wire management grooves 661 of the lateral walls 66 of the cover plates 6, the positioning plates 52 respectively abut against the top surfaces 323 of the plate bodies 321 of the end plates 32 and engage the positioning slots 324 of the end plates 32, and the hooks 53 respectively engage the engagement recesses 325 of the end plates 32, thereby fixing the cap 5 to the end plates 32. Each hook 53 is pressable to bend relative to a respective one of the positioning plates 52. When the hooks 53 are pressed to disengage from the engagement recesses 325 of the end plates 32, the cap 5 can be removed from the end plates 52.

By virtue of the hooks 53 being pressable to disengage from the engagement recesses 325 of the end plates 32, the cap 5 can be removably assembled to the end plates 32 without assistance of other tools, thereby effectively increasing convenience of assembly.

As shown in FIG. 8, when each housing cover 4 is in the closed position and when the cap 5 is assembled to the end plates 32 of the housing body 3, because the cap body 51 abuts against the top walls 621 of the end frames 62 of the cover plates 6 of the housing covers 4 and covers the second guide rails 64 and the wire management grooves 661 of the lateral walls 66 of the cover plates 6, the cap 5 not only prevents the rain water from flowing past a gap between the lateral walls 66 of the cover plates 6 and into the accommodating space 34 to adversely affect the control box 11 and the rechargeable battery 12, but also prevents the rain water from flowing into the wire management grooves 661 of the lateral walls 66 of the cover plates 6 to adversely affect the transmission cables accommodated in the wire management grooves 661.

Figure 15:
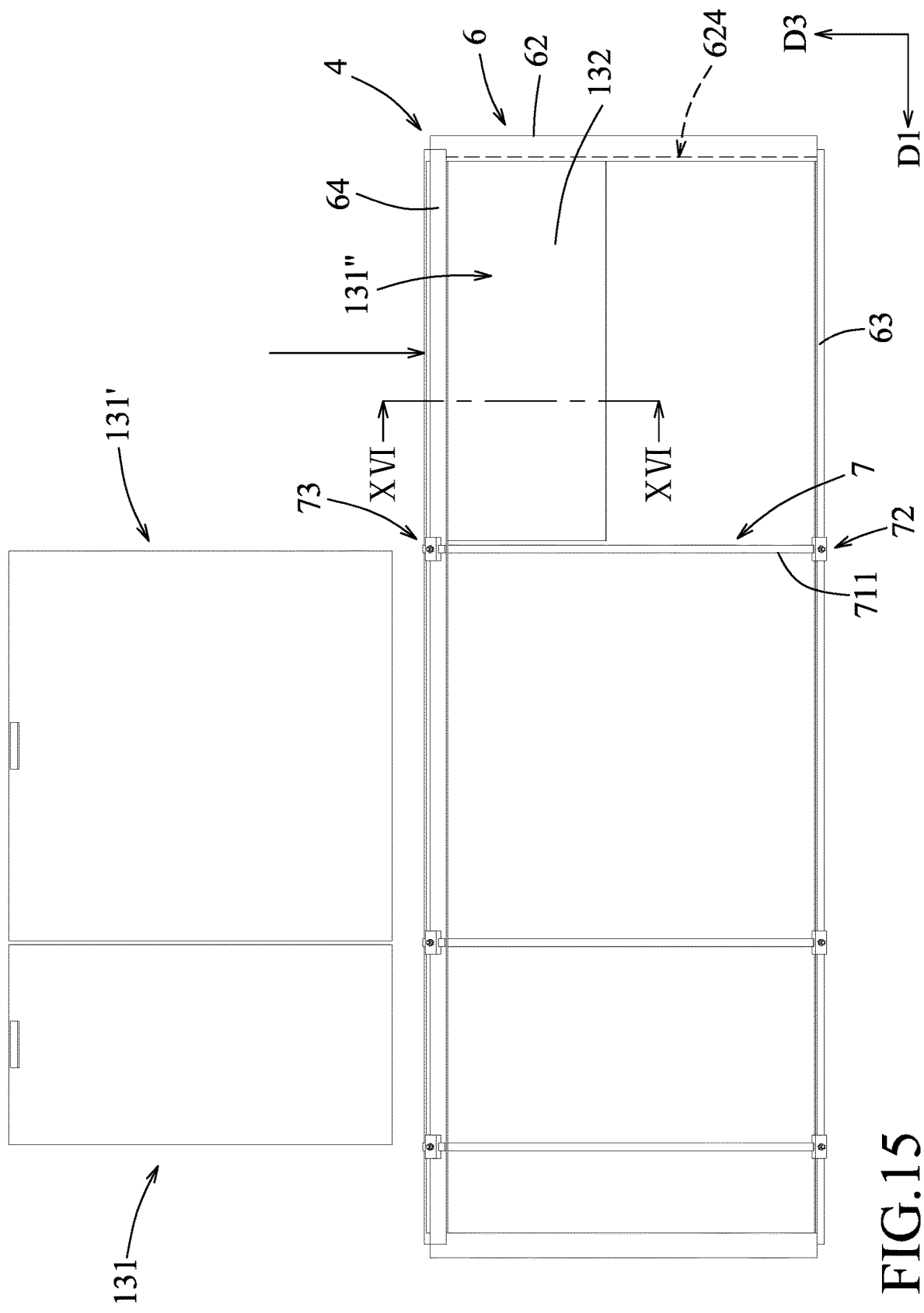
FIG. 15 is a schematic view of the embodiment illustrating how solar power panels of the solar power panel unit are assembled to the housing cover.
Figure 16:
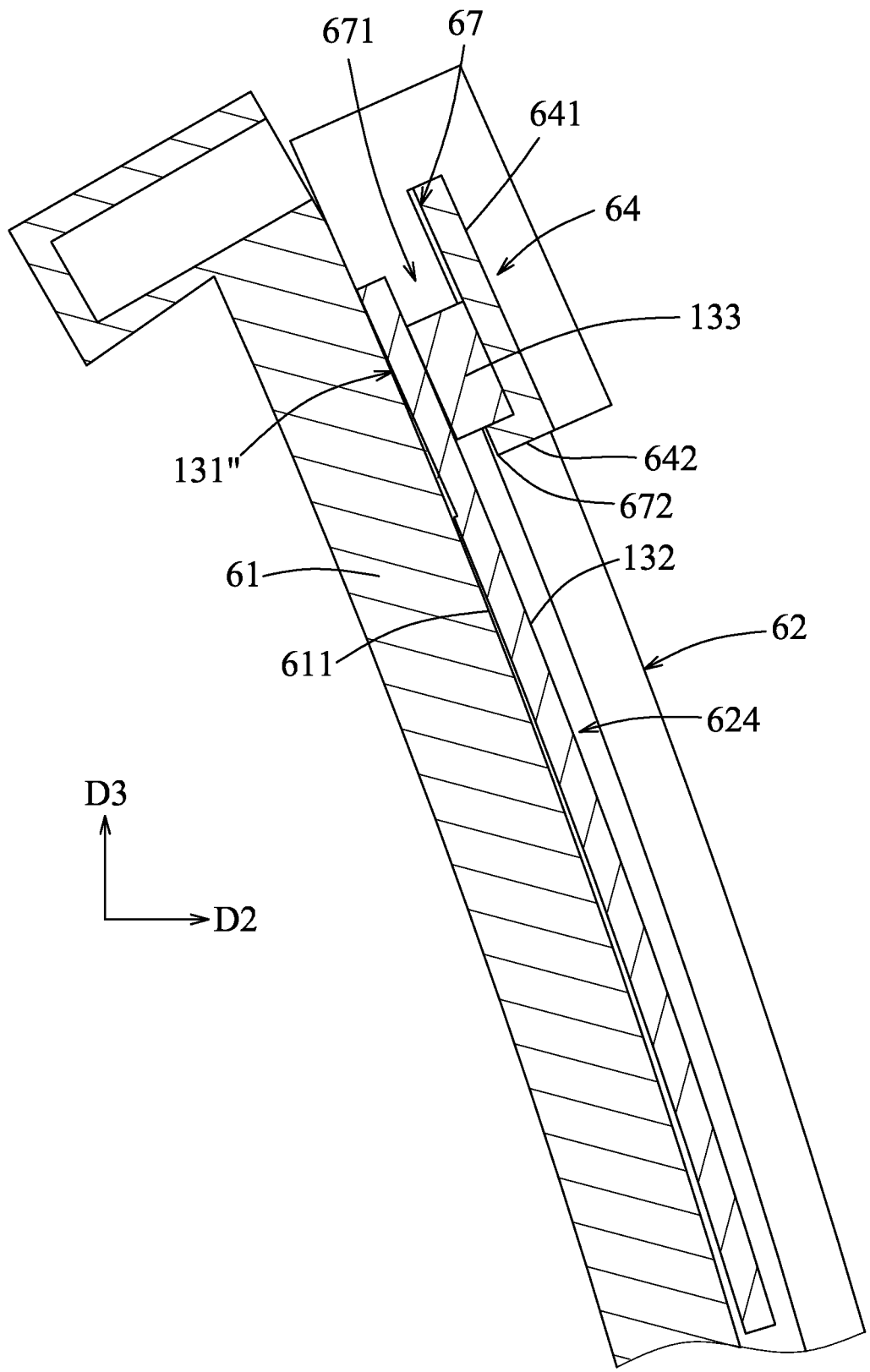
FIG. 16 is a fragmentary sectional view taken from line XVI-XVI of FIG. 15.

Referring to FIGS. 10, 15 and 16, to assemble one of the solar power panel units 13, 13' to a corresponding one of the housing covers 4, the corresponding housing cover 4 is first rotated to the open position so that the first slot portion 671 of the second lateral slot 67 is oriented upwardly. As exemplified, the solar power panel 131" with the length thereof shorter than a distance between the first and second guide rails 63, 64 is first assembled. The flexible panel body 132 of the solar power panel 131" is brought into alignment with the first slot portion 671 and a corresponding one of the end slots 624. Subsequently, the solar power panel 131" is moved through the second guide rail 64 and the first and second slot portions 671, 672 of the second lateral slot 67, and the flexible panel body 132 thereof is engaged with the corresponding end slot 624. During movement of the flexible body 132 toward the first guide rail 63, the flexible body 132 is guided and deformed by the walls defining the corresponding end slot 624 so that the flexibly body 132 is suspended smoothly along the supporting surface 611 of the cover plate 6. As shown in FIG. 16, the solar power panel 131" is moved until the junction box 133 thereof comes into contact with the stop strip 624.

Figure 17:
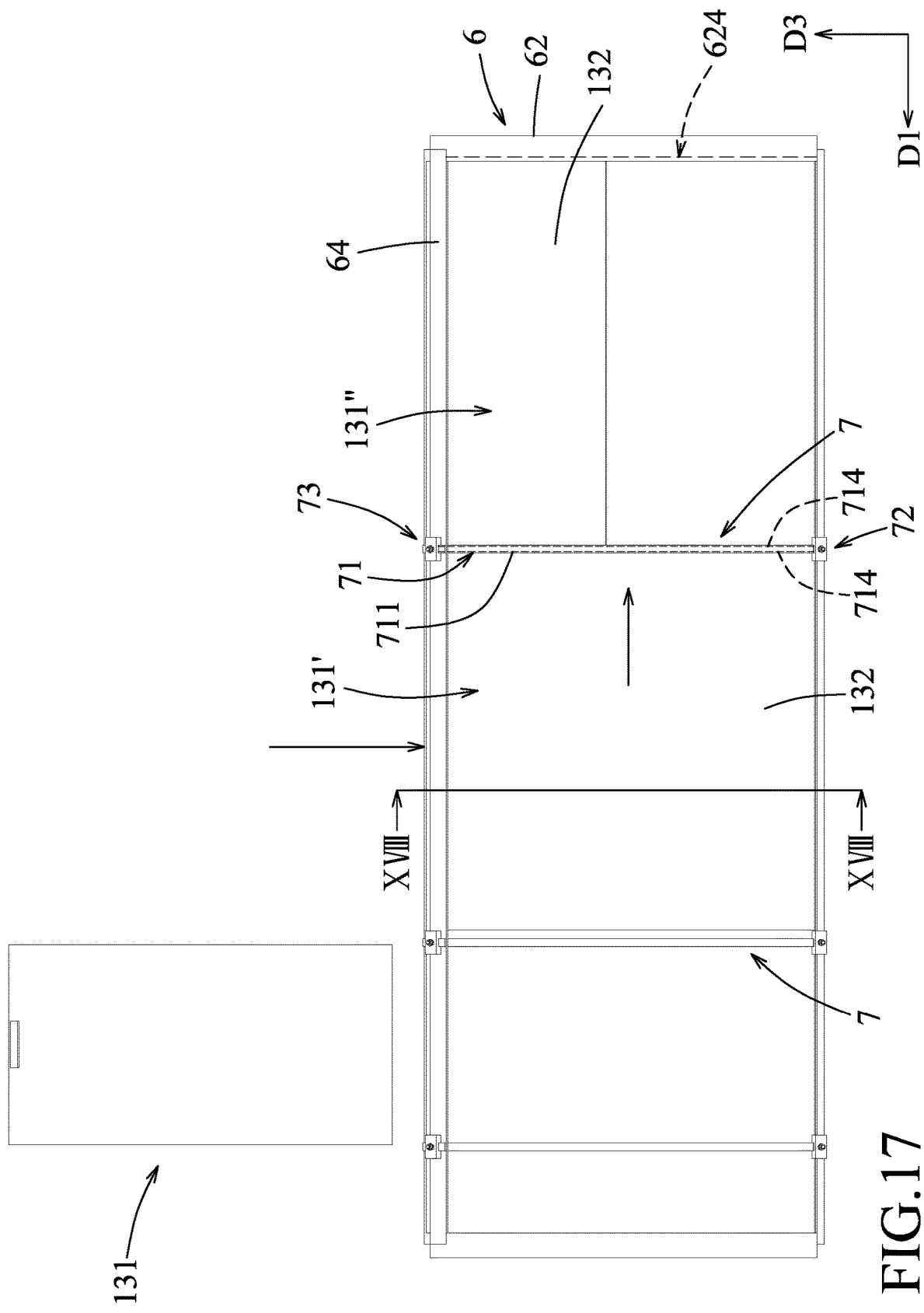
FIG. 17 is a schematic view of the embodiment illustrating how a solar power panel of the solar power panel unit is assembled to the housing cover.

Referring to FIGS. 15 and 17, a corresponding one of the retaining mechanisms 7 is moved toward the flexible panel body 132 of the solar power panel 131" in the first direction (D1) until a corresponding one of the engaging slots 714 of the corresponding retaining mechanism 7 is engaged with the flexible panel body 132. Subsequently, the first and second securing sets 72, 73 of the corresponding retaining mechanism 7 are converted to the locking states to lock the retaining bar 71 of the corresponding retaining mechanism 7 on the cover plate 6. Because the flexible panel body 132 is retained between the corresponding engaging slot 714 of the corresponding retaining mechanism 7 and the corresponding end slot 624, the solar power panel 131" is firmly fixed to the cover plate 6.

Figure 18:
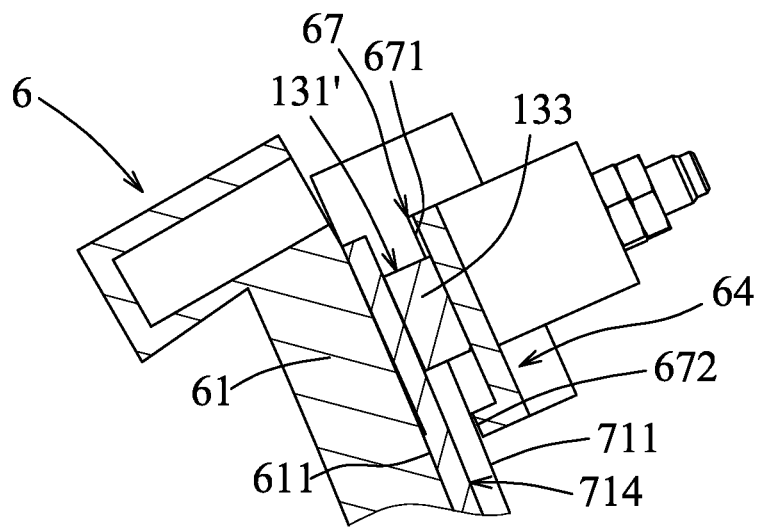
FIG. 18 is a fragmentary sectional view taken from line XVIII-XVIII of FIG. 17.
Figure 18:
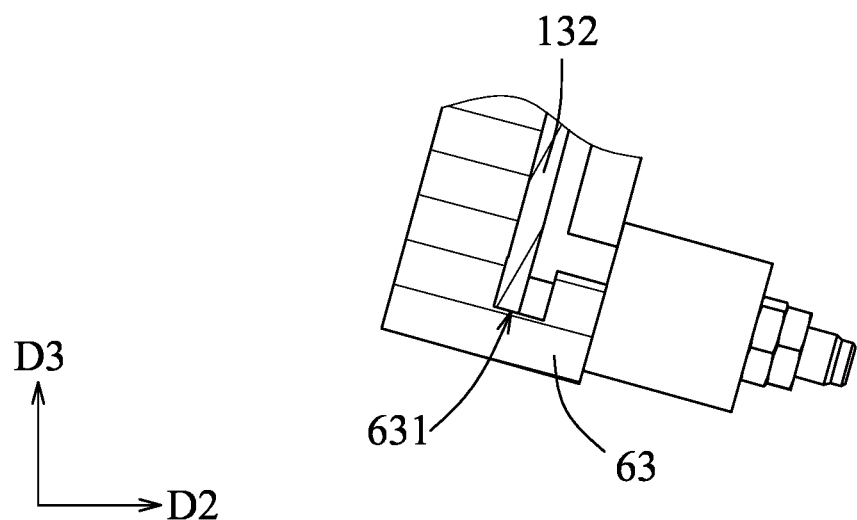

Referring to FIGS. 17 and 18, to assemble the solar power panel 131', the flexible panel body 132 of the solar power panel 131' is moved through the second guide rail 64 and the first and second slot portions 671, 672 of the second lateral slot 67. By bending the flexible panel body 132 of the solar power panel 131', a side of the flexible panel body 132 of the solar power panel 131' is engaged with the first lateral slot 631 of the first guide rail 63. Afterwards, the solar power panel 131' is moved in the first direction (D1) toward the corresponding retaining mechanism 7 that retains the solar power panel 131", so that the flexible panel body 132 of the solar power panel 131' engages with the other one of the engaging slots 714 of the corresponding retaining mechanism 7 that retains the solar power panel 131".

Figure 19:
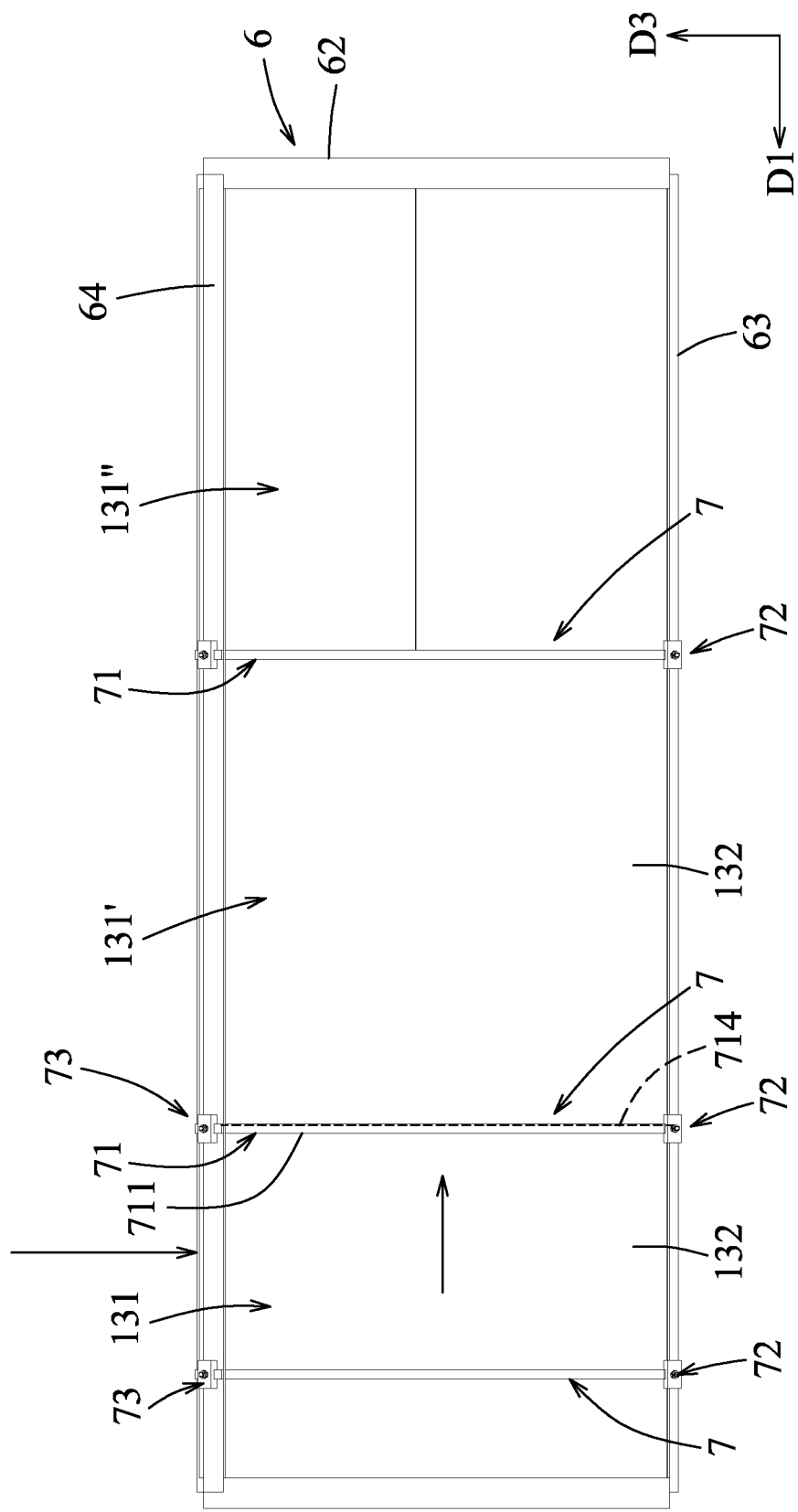
FIG. 19 is a schematic view of the embodiment illustrating the solar power panel unit being assembled to the cover plate by the retaining mechanisms.

As shown in FIGS. 17 and 19, an adjacent retaining mechanism 7 is moved in the first direction (D1) toward the flexible panel body 132 of the solar power panel 131' until a corresponding one of the engaging slots 714 of the adjacent retaining mechanism 7 engages the flexible panel body 132 of the solar power panel 131'. Afterwards, the first and second securing sets 72, 73 of the adjacent retaining mechanism 7 are converted to the locking states to lock the retaining bar 71 of the adjacent retaining mechanism 7 on the cover plate 6. Because two opposite sides of the flexible panel body 132 of the solar power panel 131' respectively engage the engaging slots 714 of the two adjacent retaining mechanisms 7, the solar power panel 131' is firmly fixed to the cover plate 6.

Referring to FIG. 19, the solar power panel 131 is assembled and firmly fixed in the same manner as the solar power panel 131' to the cover plate 6.

Referring back to FIGS. 17 to 19, to disassemble the solar power panel 131 from the housing cover 4 for maintenance or replacement, the first and second securing sets 72, 73 of a corresponding one of the retaining mechanisms 7 are converted to the unlocking states. Subsequently, the retaining bar 71 of the corresponding retaining mechanism 7 is moved in the first direction (D1) away from the flexible panel body 132 of the solar power panel 131, so that the flexible panel body 132 of the solar power panel 131 is moved and disengaged from the engaging slots 714 of the two adjacent corresponding retaining mechanisms 7. Afterwards, the solar power panel 131 is pulled and moved away from the first and second lateral slots 631, 67 in order to be maintained or replaced.

According to the disclosure, each of the solar power panels 131, 131", and 131" of the solar power panel unit 13' can be assembled or disassembled with respect to the corresponding housing cover 4 without additional components, such as screws or glue, thereby increasing convenience for assembly or disassembly and effectively facilitating operation.

Referring to FIGS. 15, 17 and 19, by virtue of the retaining mechanisms 7 sliding in a first direction (D1) relative to and being locked on the cover plate 6 according to the width of the flexible panel body 132 of each of the solar power panels 131, 131', and 131" in the first direction (D1), the flexible panel bodies 132 of the solar power panels 131, 131', and 131" are assembled and fixed to the cover plate 6 by the retaining mechanisms 7 without width limitations, thereby greatly increasing flexibility of assembly. As shown in FIGS. 15 and 16, while the length of the flexible panel body 132 of the solar power panel 131" is shorter than the distance between the first and second guide rails 63, 64, because the stop strip 642 of the second guide rail 64 confines the junction box 133 of the solar power panel 131", the flexible panel body 132 of the solar power panel 131" can be assembled to and fixed on the cover plate 6 without a length limitation, thereby further increasing flexibility of assembly. In addition to the flexible panel body 132 of one of the solar power panel 131, 131' and 131" being retained between two adjacent ones of the retaining mechanisms 7, one of the end frames 62 and an adjacent one of the retaining mechanisms 7 cooperate with each other to retain the flexible panel body 132 of one of the solar power panel 131, 131' and 131", thereby further increasing flexibility of assembly.

For each housing cover 4, by virtue of the cover plate 6 elongated in the first direction (D1) and having the arcuate cross section in a second direction (D2), a large number of the solar power panels 131, 131', 131" being different in size from one another can be assembled to the cover plate 6 by the retaining mechanisms 7 even when the size of the top surface of the vehicle body is limited. Therefore, the support housing 2 can be loaded with a large number of the solar power panels 131, 131", 131' by the two housing covers 4, thereby supplying high wattage power and increasing a power generation efficiency.

In one variant embodiment of the solar power system 100 according to the disclosure, the number of solar power panel unit 13, 13', each of the number of the openings 35 and the number of the housing covers 4 can be one.

In another variant embodiment of the solar power system 100, the end slot 624 of each end frame 62 is omitted, and the flexible panel bodies 132 of the solar power panels 131, 131' and 131" are retained by only the retaining mechanisms 7.

In still another variant embodiment of the solar power system 100, the plate body 321 of each end plate 32 can be in the form of a long plate, the cover plate 6 of each housing cover 4 can have a rectangular cross section in the second direction (D2), and the bar body 711 of each retaining mechanism 7 can be in the form of a long strip.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, the one or more features may be singled out and practiced alone without the another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A support housing, comprising:
   a housing body defining an accommodating space and having at least one opening spatially communicated with said accommodating space; and
   at least one housing cover including
      a cover plate connected to said housing body and operable to close and open said at least one opening, said cover plate being adapted to support at least one solar power panel, and
      a plurality of retaining mechanisms connected to said cover plate and slidable in a first direction relative to said cover plate, said retaining mechanisms being spaced apart from one another in the first direction, any two adjacent ones of said retaining mechanisms being movable toward and away from each other to adjust a distance therebetween so that the at least one solar power panel is clamped therebetween.

2. The support housing as claimed in claim 1, wherein said cover plate is elongated in the first direction.

3. The support housing as claimed in claim 2, wherein:
   said cover plate has a supporting surface adapted to support the at least one solar power panel, said supporting surface having an arcuate cross section in a second direction transverse to the first direction; and
   each of said retaining mechanisms includes a retaining bar that is slidably connected to said cover plate so as to retain the at least one solar power panel, said retaining bar being arcuate and elongated in the second direction.

4. The support housing as claimed in claim 1, wherein each of said retaining mechanisms includes
   a retaining bar that is slidably connected to said cover plate and that is adapted to retain the at least one solar power panel,
   a first securing set to lock an end of said retaining bar on said cover plate, and
   a second securing set to lock an opposite end of said retaining bar on said cover plate.

5. The support housing as claimed in claim 4, wherein:
   said cover plate has a first lateral slot adapted to be engaged with a side of the at least one solar power panel, and a second lateral slot adapted to be engaged with an opposite side of the at least one solar power panel, said first and second lateral slots being spaced from each other in a second direction transverse to the first direction; and
   said retaining bar has a bar body slidable within said second lateral slot, said bar body being elongated in the second direction, and having two engaging slots that are opposite to each other in the first direction and that are adapted to be engaged with two of the solar power panels, respectively.

6. The support housing as claimed in claim 5, wherein:
   said cover plate further has a first guide rail defining said first lateral slot, and a second guide rail disposed adjacent to said second lateral slot; and
   said retaining bar further has a first sliding member that is connected to said bar body and that is slidably hung on said first guide rail, and a second sliding member that is connected to said bar body and that is slidably hung on said second guide rail.

7. The support housing as claimed in claim 4, wherein:
   said cover plate has a first guide rail and a second guide rail that are elongated in the first direction, said first and second guide rails being spaced apart from each other in a second direction transverse to the first direction;
   said retaining bar has a first sliding member slidably hung on said first guide rail, and a second sliding member slidably hung on said second guide rail, said first sliding member having a first pressing portion contacting said first guide rail, said second sliding member having a second pressing portion contacting said second guide rail;
   said first securing set includes a first holding block that abuts against said first guide rail, a first bolt that is movably inserted through said first holding block and that abuts against said first pressing portion, and a first nut that is threadedly connected to said first bolt and that abuts against a side of said first holding block distal from said first guide rail, said first nut being operably rotatable to drive movement of said first bolt until said first bolt locks said first pressing portion on said first guide rail; and said second securing set includes a second holding block that abuts against said second guide rail, a second bolt that is movably inserted through said second holding block and that abuts against said second pressing portion, and a second nut that is threadedly connected to said second bolt and that abuts against a side of said second holding block distal from said first guide rail, said second nut being operably rotatable to drive movement of said second bolt until said second bolt locks said second pressing portion on said second guide rail.

8. The support housing as claimed in claim 5, wherein said cover plate further has two end slots that are spaced apart from each other in the first direction and that are spatially communicated with said first and second lateral slots, each of said end slots being adapted to be engageable with the at least one solar power panel.

9. The support housing as claimed in claim 6, wherein:
said cover plate further has a supporting surface that is adapted to support the at least one solar power panel and that is spaced apart from said second guide rail;
said second lateral slot is disposed between said supporting surface and said second guide rail; and
said second guide rail includes a guide plate which is spaced apart from said supporting surface and on which said second sliding member is slidably hung, and a stop strip that projects from said guide plate toward said supporting surface, said stop strip being adapted to confine a junction box of the at least one solar power panel in said second lateral slot.

10. The support housing as claimed in claim 6, wherein:
said at least one opening includes two openings;
said at least one housing cover includes two housing covers, said housing covers being spaced apart from each other in the second direction and being pivotally connected to said housing body, each of said housing covers being rotatable relative to said housing body between a closed position, where a respective one of said openings is closed, and an open position, where the respective one of said openings is opened;
said housing body includes two end plates disposed opposite to each other in the first direction;
said cover plate of each of said housing covers includes two end frames disposed opposite to each other in the first direction, and a lateral wall connected between said end frames, said end frames being respectively connected to said end plates, said lateral wall having a wire management groove;
said support housing further comprises a cap; and
when each of said housing covers is in the closed position, lateral walls of cover plates of said housing covers are adjacent to each other, said end frames of said cover plates respectively cover said end plates, and said cap can be removably assembled to said end plates so as to cover said wire management grooves of said lateral walls.

11. A solar power system, comprising:
a solar power apparatus including a control box, a rechargeable battery, and at least one solar power panel unit, said at least one solar power panel unit including a plurality of solar power panels; and
the support housing as claimed in claim 1,
wherein the at least one solar power panel includes the plurality of solar power panels.

12. The solar power system as claimed in claim 11, wherein said cover plate is elongated in the first direction.

13. The solar power system as claimed in claim 12, wherein:
each of said solar power panels is a flexible solar panel;
said cover plate has a supporting surface supporting the solar power panels, said supporting surface having an arcuate cross section in a second direction transverse to the first direction; and
each of said retaining mechanisms includes a retaining bar that is slidably connected to said cover plate so as to retain two adjacent ones of said power solar power panels, said retaining bar being arcuate and elongated in the second direction.

14. The solar power system as claimed in claim 11, wherein each of said retaining mechanisms includes
a retaining bar that is slidably connected to said cover plate to retain two adjacent ones of said solar power panels,
a first securing set to lock an end of said retaining bar on said cover plate, and
a second securing set to lock an opposite end of said retaining bar on said cover plate.

15. The solar power system as claimed in claim 14, wherein:
said cover plate has a first lateral slot engaged with said solar power panels, and a second lateral slot engaged with said solar power panels, said first and second lateral slots being spaced from each other in a second direction transverse to the first direction; and
said retaining bar has a bar body slidable within said second lateral slot, said bar body being elongated in the second direction, and having two engaging slots that are opposite to each other in the first direction, each of said engaging slots being engaged with a corresponding one of said solar power panels.

16. The solar power system as claimed in claim 15, wherein:
said cover plate further has a first guide rail defining said first lateral slot, and a second guide rail disposed adjacent to said second lateral slot; and
said retaining bar further has a first sliding member that is connected to said bar body and that is slidably hung on said first guide rail, and a second sliding member that is connected to said bar body and that is slidably hung on said second guide rail.

17. The solar power system as claimed in claim 14, wherein:
said cover plate has a first guide rail and a second guide rail that are elongated in the first direction, said first and second guide rails being spaced apart from each other in a second direction transverse to the first direction;
said retaining bar has a first sliding member slidably hung on said first guide rail, and a second sliding member slidably hung on said second guide rail, said first sliding member having a first pressing portion contacting said first guide rail, said second sliding member having a second pressing portion contacting said second guide rail;
said first securing set includes a first holding block that abuts against said first guide rail, a first bolt that is movably inserted through said first holding block and that abuts against said first pressing portion, and a first nut that is threadedly connected to said first bolt and that abuts against a side of said first holding block distal from said first guide rail, said first nut being operably rotatable to drive movement of said first bolt until said first bolt locks said first pressing portion on said first guide rail; and said second securing set includes a second holding block that abuts against said second guide rail, a second bolt that is movably inserted through said second holding block and that abuts against said second pressing portion, and a second nut that is threadedly connected to said second bolt and that abuts against a side of said second holding block distal from said first guide rail, said second nut being operably rotatable to drive movement of said second bolt until said second bolt locks said second pressing portion on said second guide rail.

18. The solar power system as claimed in claim 15, wherein said cover plate further has two end slots that are spaced apart from each other in the first direction and that are spatially communicated with said first and second lateral slots, each of said end slots being engageable with a corresponding one of the solar power panels.

19. The solar power system as claimed in claim 16, wherein:

said cover plate further has a supporting surface that supports said solar power panels and that is spaced apart from said second guide rail;

said second lateral slot is disposed between said supporting surface and said second guide rail;

said second guide rail includes a guide plate which is spaced apart from said supporting surface and on which said second sliding member is slidably hung, and a stop strip that projects from said guide plate toward said supporting surface; and each of said solar power panels has a junction box that is disposed in said second lateral slot and that is confined in said second lateral slot by said stop strip.

20. The solar power system as claimed in claim 11, wherein:

said solar power apparatus includes two solar power panel units;

said at least one opening includes two openings;

said at least one housing cover includes two housing covers respectively supporting said solar power panel units, said housing covers being spaced apart from each other in a second direction transverse to the first direction and being pivotally connected to said housing body, each of said housing covers being rotatable relative to said housing body between a closed position, where a respective one of said openings is closed, and an open position, where the respective one of said openings is opened;

said housing body includes two end plates disposed opposite to each other in the first direction;

said cover plate of each of said housing covers includes two end frames disposed opposite to each other in the first direction, and a lateral wall connected between said end frames, said end frames being respectively connected to said end plates, said lateral wall having a wire management groove;

said support housing further includes a cap; and when each of said housing covers is in the closed position, lateral walls of cover plates of said housing covers are adjacent to each other, said end frames of said cover plates respectively cover said end plates, and said cap can be removably assembled to said end plates so as to cover said wire management grooves of said lateral walls.

* * * * *